US007706365B2

(12) United States Patent
Effros et al.

(10) Patent No.: US 7,706,365 B2
(45) Date of Patent: Apr. 27, 2010

(54) RANDOMIZED DISTRIBUTED NETWORK CODING

(75) Inventors: Michelle Effros, Pasadena, CA (US); Tracey Ho, Sudbury, MA (US); David Karger, Cambridge, MA (US); Ralf Koetter, Champaign, IL (US); Muriel Medard, Cambridge, MA (US)

(73) Assignees: California Institute of Technology, Pasadena, CA (US); Massachusetts Institute of Technology, Cambridge, MA (US); Board of Trustees of the University of Illinois, Urbana, IL (US)

( * ) Notice: Subject to any disclaimer, the term of this patent is extended or adjusted under 35 U.S.C. 154(b) by 1239 days.

(21) Appl. No.: 10/992,463

(22) Filed: Nov. 17, 2004

(65) Prior Publication Data

US 2005/0152391 A1 Jul. 14, 2005

Related U.S. Application Data

(60) Provisional application No. 60/524,926, filed on Nov. 25, 2003.

(51) Int. Cl.
  *H04L 12/56* (2006.01)
(52) U.S. Cl. .................................................. 370/389
(58) Field of Classification Search ........................ None
  See application file for complete search history.

(56) References Cited

U.S. PATENT DOCUMENTS 6,885,653 B2 * 4/2005 Choi et al. ................. 370/342
7,349,440 B1 * 3/2008 Chou et al. ................. 370/503
7,408,938 B1 * 8/2008 Chou et al. ................. 370/394
7,529,198 B2 * 5/2009 Jain et al. .................... 370/256
2005/0010675 A1 * 1/2005 Jaggi et al. ................. 709/232
2008/0291834 A1 * 11/2008 Chou et al. ................. 370/238
2009/0135717 A1 * 5/2009 Kamal et al. ................ 370/225
2009/0198829 A1 * 8/2009 Sengupta et al. ........... 709/233
2009/0207930 A1 * 8/2009 Sirkeci et al. ............... 375/267
2009/0238097 A1 * 9/2009 Le Bars et al. .............. 370/254
2009/0248898 A1 * 10/2009 Gkantsidis et al. .......... 709/246
2009/0285148 A1 * 11/2009 Luo et al. .................... 370/315
2009/0316763 A1 * 12/2009 Erkip et al. ................. 375/211

OTHER PUBLICATIONS

Koetter R., et al, "Beyond Routing: An Algebraic Approach to Network Coding", IEEE INFOCOM, pp. 122-130 (Jun. 2002).*
Ahlswede, R., et al, "Network Information Flow", *IEEE Transactions of Information Theory*, vol. 46. No. 4, pp. 1204-1216 (Jul. 2000).
Awerbuch, B., et al, "On-line Generalized Steiner Problem", *Proceeding of the 7th Annual ACM-SIAM Symposium on Discrete Algorithms*; pp. 1-13 (1996).
Berman, P., et al, "Improved Approximations for the Steiner Tree Problem", *Journal of Algorithims*, 17, pp. 381-408 (Mar. 4, 1994).

(Continued)

*Primary Examiner*—Ayaz R Sheikh
*Assistant Examiner*—Timothy J Weidner
(74) *Attorney, Agent, or Firm*—Steinfl & Bruno

(57) ABSTRACT

A network and a method for transmitting processes in a network are disclosed, where a randomized coding approach is provided. Network nodes transmit on each outgoing link a linear combination of incoming signals, specified by independently and randomly chosen code coefficients from a finite field. The approach allows robust, distributed transmission and compression of information in networks and is advantageous over routing-based approaches.

11 Claims, 2 Drawing Sheets

OTHER PUBLICATIONS

Chakrabarti, A., et al, "Approximation Algorithms for the Unsplittable Flow Problem", *Proceedings of the 5th International Workshop on Approximation Algorithms for Combinatorial Optimization*, pp. 1-24 (Mar. 22, 2004).

Charikar, M., et al, "Approximation Algorithms for Directed Steiner Problems", *Proceedings of the 9th ACM-SIAM Symposium on Discrete Algorithms*, pp. 1-15 (1998).

Chou, P., et al, "Practical Network Coding", *Proceedings of the 41st Annual Allerton Conference on Communication, Control, and Computing*, 10 pages total (Oct. 2003).

Ho, T., et al, "Network Coding from a Network Flow Perspective", *ISIT*; 1 page total (Jun. 29-Jul. 4, 2003).

Ho, T., et al, "The Benefits of Coding over Routing in a Randomized Setting", *Proceedings of 2003 IEEE International Symposium on Information Theory*, 1 page total (Jun. 2003).

Ho, T., et al, "On Randomized Network Coding", *Proceedings of 41st Annual Allerton Conference on Communication, Control and Computing*, pp. 1-10 (Oct. 2003).

Ho, T., et al, "On the utility of network coding in dynamic environments", *International Workshop on Wireless AD-HOC Networks (IWWAN)*, pp. 1-5 (2004).

Karpinski, M., et al, "New Approximation Algorithms for the Steiner Tree Problems", *Technical Report, Electronic Colloquium on Computational Complexity (ECCC)* TR95-030, pp. 1-16 (1995).

Kodialam, M., et al, "Online Multicast Routing with Bandwidth Guarantees: A New Approach using Multicast Network Flow", *Measurement and Modeling of Computer Systems*, 11 pages total (2000).

Koetter, R., et al, "An Algebraic Approach to Network Coding", *IEEE/ACM Transactions on Networking*, vol. 11, No. 5, pp. 782-795 (Oct. 2001).

Koetter R., et al, "Beyond Routing: An Algebraic Approach to Network Coding", *IEEE/ACM Transactions on Networking*, 9 pages total (2002).

Jaggi, S., et al, "Low Complexity Algebraic Multicast Network Codes", *Proceedings of the IEEE International Symposium on Information Theory*, 6 pages total (2003).

Li, S., et al, "Linear Network Coding", *IEEE Transactions on Information Theory*, vol. 49, No. 2, pp. 371-381 (Feb. 2003).

Noguchi, T., et al, "Performance Evaluation of New Multicast Architecture with Network Coding", *IEICE Transactions on Communication*, E86-B, No. 6, 3 pages total (Jun. 2003).

Ramanathan, S., et al, "Multicast Tree generation in Networks with Asymmetric links", *IEEE Transactions on Networking*, 4, pp. 1-12 (Aug. 1996).

Sanders, P., et al, "Polynomial Time Algorithms for Network Information Flow" *15th ACM Symposium on Parallel Algorithms and Architectures*, pp. 1-13 (2003).

Servetto, S.D., et al, "Constrained Random Walks on Random Graphs: Routing Algorithms for Large Scale Wireless Sensor Networks", *WSNA* '02, Sep. 28, pp. 12-16 (2002).

Zhu, Y., et al, "Multicast with Network Coding in Application-Layer Overlay Networks", *IEEE Journal on Selected Areas in Communication*, vol. 22, No. 1, pp. 1-13 (Jan. 2004).

* cited by examiner

RANDOMIZED DISTRIBUTED NETWORK CODING

CROSS REFERENCE TO RELATED APPLICATIONS

This application claims the benefit of U.S. provisional Patent Application Ser. No. 60/524,926, filed Nov. 25, 2003 for a "Randomized Distributed Network Coding Method and Apparatus" by Tracey Ho, Ralf Koetter, Muriel Medard and David Karger, the disclosure of which is incorporated herein by reference in its entirety.

STATEMENT REGARDING FEDERALLY SPONSORED RESEARCH OR DEVELOPMENT

The present invention was made with support from the United States Government under Grant numbers CCR-0325324, CCR-0220039 and CCR-0325496 made by the National Science Foundation. The United States Government may have certain rights in the invention.

BACKGROUND

1. Technical Field

Nodes in a computer network can also function as encoders. In particular, a node operating as encoder does not just relay or replicate information received from an input link (switch behavior), it also encodes such information. Coding at a node in a network is known as network coding.

2. Description of the Prior Art

Throughout the description of the present disclosure, reference will be made to the enclosed Annexes A1, A2, A3 and A4, which make part of the present disclosure.

Network coding enables connections that are not possible with just routing. In particular, it has been shown R. Ahlswede, N. Cai, S.-Y. R. Li, and R. W. Yeung, "Network Information Flow", IEEE Transactions on Information Theory, vol. 46, pp. 1204-1216 (2000), that it is in general not optimal to simply route or replicate the information to be multicast. Rather, by employing coding at the nodes, bandwidth can generally be saved.

A network can be represented as a directed graph, as shown in R. Koetter and M. Medard, "Beyond Routing: An Algebraic Approach to Network Coding", Proceedings of the 2002 IEEE Infocom (2002). The graph comprises source nodes and receiver nodes, where discrete independent random processes (source processes) are observable at one or more of the source nodes and output processes are observable at the receiver nodes. In the above reference, an algorithm for finding a linear coding solution to a given multicast problem, using knowledge of the entire network topology is disclosed.

However, in applications where communication is limited or expensive, it may be preferable to determine each node's behavior in a distributed manner.

SUMMARY

Acyclic delay-free networks can be modeled as delay-free acyclic graphs with unit capacity directed links and one or more discrete sources. A typical problem connected with such networks is the multicast connection problem, where all source processes have to be transmitted to each of the receiver nodes.

The present disclosure provides a method to solve the multicast connection problem on acyclic delay-free networks by means of linear coding, i.e. where the sources are independent or linearly correlated. Such method is also generalized to networks with cycles and delays, and to arbitrarily correlated sources.

According to a first aspect, a network is provided comprising: one or more source nodes, wherein source processes are observable at the source nodes; one or more receiver nodes, wherein receiver processes are observable at the receiver nodes; and coding nodes, allowing communication of the source processes to each receiver node of the receiver nodes, the coding nodes being connected with input links for communication of input signals to the coding nodes and output links for communication of output signals from the coding nodes, wherein the output signals are a linear combination of the input signals and wherein coefficients of the linear combination are randomly chosen.

According to a second aspect, a network is provided comprising nodes allowing communication of processes, each node having input links for communication of input signals to the node, and output links for communication of output signals from the node, wherein the output signals are a linear combination of the input signals, wherein coefficients at each node are randomly chosen from a finite field, and the overall linear combinations obtained by transmission through the network are polynomials in a delay variable.

According a third aspect, a method for transmitting processes from one or more sources to each receiver of one or more receivers in a network is provided, the method comprising: providing coding nodes between the one or more sources and the one or more receivers; providing, for each coding node, input links for transmitting input signals to the coding node, and output links for transmitting output signals from the coding nodes, the output signals being a linear combination of the input signals; randomly choosing, for each coding node, coding coefficients, the coding coefficients being the coefficients of the linear combination of the input signals.

According to a fourth aspect, a network is provided, comprising: one or more source nodes, wherein source processes are observable at the source nodes; one or more receiver nodes, wherein receiver processes are observable at the receiver nodes; and coding nodes, allowing communication of the source processes to each receiver node of the receiver nodes, the coding nodes being connected with input links for communication of input signals to the coding nodes and output links for communication of output signals from the coding nodes, wherein the output signals are obtained by a combination of the input signals and wherein the combination is associated with a random choice.

The approach according to the present disclosure achieves robustness in a way quite different from traditional approaches. Traditionally, compression is applied at source nodes so as to minimize required transmission rate and leave spare network capacity, and the addition of new sources may require re-routing of existing connections. The approach according to the present disclosure fully utilizes available or allocated network capacity for maximal robustness, while retaining full flexibility to accommodate changes in network topology or addition of new sources.

The approach according to the present disclosure is useful in all those environments where networks are adopted, such as computer/communications networks (especially overlay networks, ad hoc networks, sensor networks), and distributed computer systems.

DETAILED DESCRIPTION

A first embodiment of the present disclosure makes reference to acyclic delay-free networks, as also generally shown in Annex A1 and more specifically in Annex A2.

Figure 1:
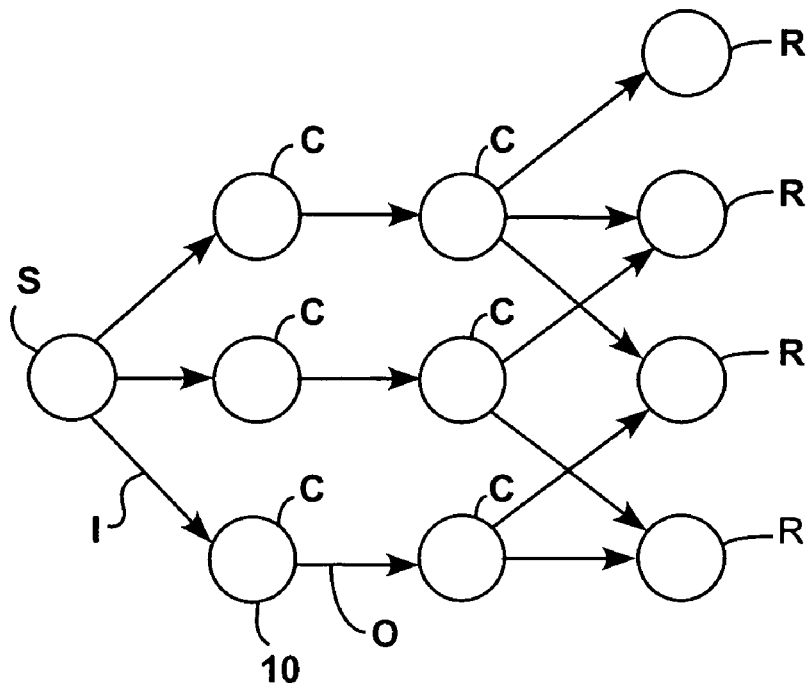
FIGS. 1 and 2 show schematic representations of acyclic networks.
Figure 2:
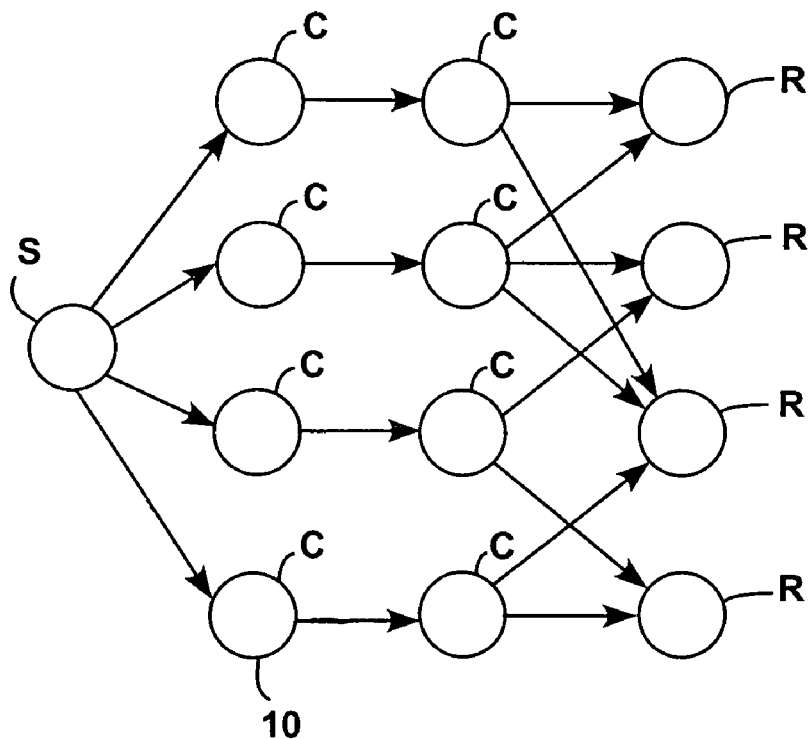

FIGS. 1 and 2 show two examples of acyclic networks having source nodes S and receiver nodes R, and a plurality of intermediate nodes C. The intermediate nodes allow communication of source processes to each receiver node R. The intermediate nodes (see node 10, for example) have input links I and output links O. The input links I communicate input signals to the node 10, while the output links O communicate or transmit output signals from the intermediate nodes.

Differently from what shown in the prior art, the present disclosure considers an approach, in which network nodes independently and randomly choose code coefficients from some finite field and transmit on each outgoing link a linear combination of incoming signals, specified by the independently and randomly chosen code coefficients from some finite field. For a detailed explanation, reference is made to sections II and III of Annex A2.

The management information comprised of the various linear combinations can be maintained and sent through the network, for each signal in the network, as a vector of scalar coefficients for each of the source processes, and updated at each coding node by applying the same linear combinations or mappings to the coefficient vectors as to the data or information signals. For a detailed explanation, reference is made to section II and III of Annex A2.

According to the present disclosure, a lower bound is provided on the success probability of random network coding for multicast connections. See Theorem 1 in section III of Annex A2. The corresponding upper bound on failure probability is on the order of the inverse of the size of the finite field from which the code coefficients are shown. See Theorem 1 in section III of Annex A2. The result obtained in Theorem 1 shows that the failure probability can be made arbitrarily small by choosing code coefficients in a sufficiently large finite field, and that the failure probability decreases exponentially with the number of codeword bits. Since routing state does not have to be exchanged or maintained, random linear codes are potentially very useful for networks with unknown or changing topologies. Proof of Theorem 1 is provided in section IV of Annex A2.

In particular, an upper bound on the routing success probability for a source-receiver pair on a grid network in terms of their relative grid locations is combinatorially derived, which is surpassed by the corresponding lower bound for randomized coding in sufficiently large finite fields.

The lower bound on coding success probability applies for linearly correlated sources, for which the effect of randomized coding can be viewed as distributed compression occurring within the network rather than at the sources.

In other words, for a feasible multicast connection problem and a randomized code of sufficient complexity, with high probability the information flowing across any cut will be sufficient to reconstruct the original source processes.

Additionally, it is shown that the only management information needed by the receiver nodes for decoding will be the overall linear combination of source processes present in each of their incoming signals.

The present disclosure illustrates the advantages of randomized linear coding over randomized routing in rectangular grid networks. This can be seen by comparing the results of Theorem 2 and Theorem 3 of section III of Annex A2 and by making reference to Table I at page 4 of Annex A2. The utility of randomized linear coding is also shown by simulation in networks where receivers dynamically join and leave. See section V of Annex A4. Randomized linear coding has the same success bound for linearly correlated sources. Therefore, randomized linear coding effectively compresses correlated information to the capacity of any cut that it passes through.

This is achieved without the need for any coordination among the source nodes, which is advantageous in distributed environments where such coordination is impossible or expensive.

The first embodiment above considers independent or linearly correlated sources on acyclic delay-free networks, and shows an upper bound on error probability that decreases exponentially with the length of the codes. See also Lemma 1 in section IV of Annex A2.

According to a second embodiment, these results can be generalized to networks with cycles and delays. Reference can be made to Annex A3.

Going from the acyclic delay-free case to the case with cycles and delay, the scalar coefficients of the linear combinations become polynomials in a delay variable. The number of terms of the polynomials to be sent, and the memory required at the receivers, depend on the number of links involved in cycles (memory registers) in the network. For less frequently changing networks, instead of sending coefficient vectors through the network, a phase can be provided in which the sources take turns to each send a unit impulse through the network. See section 2 of Annex A3.

In this second embodiment, similar results to those shown with reference to the first embodiment are obtained. See Theorems 1-4 in Section 3 of Annex A3 and related proof in Section 4 of Annex A3.

In particular, bounds for the success probability of distributed randomized network coding for multi-source multicast in networks are shown. The first (see Theorem 1 in Sections 3 and 4 of Annex A3) is a very general bound for arbitrary networks, which may have cycles or delay, in term of the number of receivers and the number of links with independently chosen linear mappings.

Further, an approach for obtaining tighter results for more specific networks has been provided. For any given acyclic network, randomized coding success probability can be bounded by the probability of connection feasibility in a related network problem with unreliable links (see Theorem 3 in sections 3 and 4 of Annex A3). From this, the Applicants have obtained a success probability bound for randomized network coding in networks with unreliable links and excess capacity, in terms of link failure probability and amount of redundancy, as shown by Theorem 4 in sections 3 and 4 of Annex A3.

According to a third embodiment, these results can be generalized to arbitrarily correlated sources. Reference can be made to Annex A4.

In this third embodiment, randomized linear network coding is done over vectors of bits in the finite field of size two.

This can be treated similarly to the first two embodiments by conceptually extending each source into multiple sources and each link into multiple links, such that each new source and link corresponds to one bit in the code vectors. Randomized coding and transmission of code coefficients to the receivers can then be done similarly to the previous embodiments. See section II of Annex A4.

Similar results to those shown with reference to the first two embodiments are obtained. In particular, a bound on the error probability for distributed randomized linear coding of arbitrarily correlated sources over an arbitrary network is given, which decreases exponentially with the number of codeword bits. See Theorem 1 in Section III of Annex A4.

Figure 3:
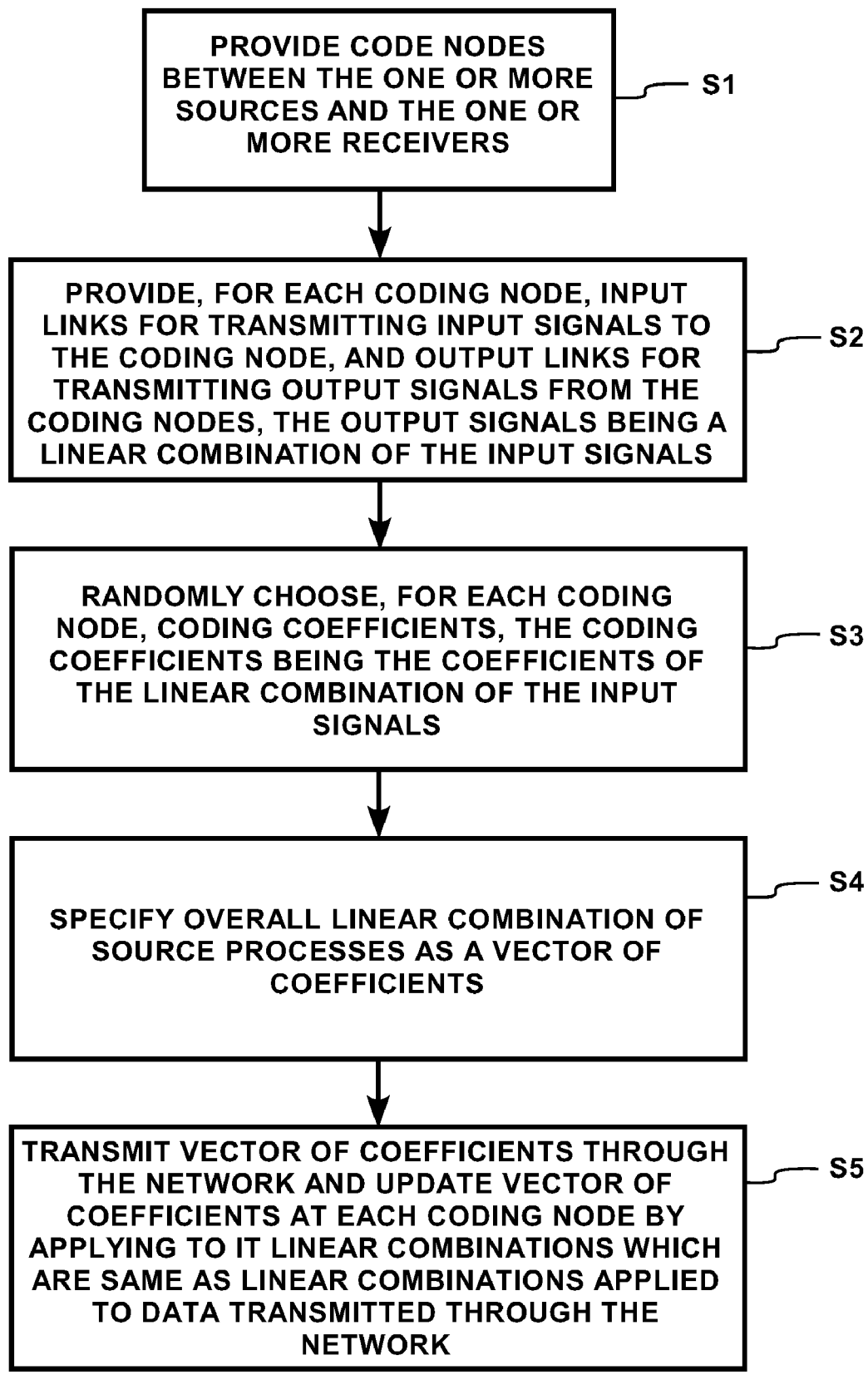
FIG. 3 shows a series of steps in accordance with the present disclosure.

FIG. 3 shows a series of steps in accordance with the present disclosure. In step S1, code nodes are provided between the one or more sources and the one or more receivers. In step S2, for each coding node, input links are provided for transmitting input signals to the coding node, and output links are provided for transmitting output signals from the coding nodes, the output signals being a linear combination of the input signals. In step S3, coding coefficients are randomly chosen, for each coding node, the coding coefficients being the coefficients of the linear combination of the input signals. In step S4. the overall linear combination of source processes is specified as a vector of coefficients. In step S5. the vector of coefficients is transmitted through the network and undated at each coding node by applying to it linear combinations which are the same as the linear combinations applied to the data transmitted to the network.

While several illustrative embodiments of the invention have been shown and described in the above description and in the enclosed Annexes A1, A2, A3 and A4, numerous variations and alternative embodiments will occur to those skilled in the art. Such variations and alternative embodiments are contemplated, and can be made without departing from the scope of the invention as defined in the appended claims. For example, in case of a nonlinear combination of the input signals, part of the formation of the nonlinear combination can involve a random linear combination of a function of the input signals or be associated with some other related random choice. Additionally, the matrix characteristics of the combination may involve a random choice. Techniques similar to those described can be applied over fields other than finite fields. Also, there may be variations on the format and procedure by which information specifying the cumulative transformation for each signal in the network resulting from transformations at individual network nodes is sent to the network and updated at intermediate nodes.

ANNEX A1

The Benefits of Coding over Routing in a Randomized Setting

*Abstract* — We present a novel randomized network coding approach for robust, distributed transmission and compression of information in networks, and demonstrate its advantages over routing-based approaches.

We present a randomized network coding approach for robust, distributed transmission and compression of information in networks. Network nodes transmit on each outgoing link a linear combination of incoming signals, specified by independently and randomly chosen code coefficients from some finite field $\mathbb{F}_q$. The only information needed for decoding at the receivers is the overall linear combination of source processes present in each of their incoming signals. This information can be maintained, for each signal in the network, as a vector of coefficients for each of the source processes, and updated by each coding node applying the same linear combinations to the coefficient vectors as to the data. See [1], [3] for prior work on network coding, [4] for work on randomized routing, and [2] for supporting results used in our proofs.

We give a lower bound on the success probability of random network coding for multicast connections, based on the form of transfer matrix determinant polynomials [3], that is tighter than the Schwartz-Zippel bound for general polynomials of the same total degree. The corresponding upper bound on failure probability is on the order of the inverse of the size of the finite field, showing that it can be made arbitrarily small by coding in a sufficiently large finite field, and that it decreases exponentially with the number of codeword bits. This suggests that random codes are potentially very useful for networks with unknown or changing topologies.

We model a network as a delay-free acyclic graph with unit capacity directed links[1] and one or more discrete sources.

Theorem 1 *For a feasible multicast connection problem with independent or linearly correlated sources, and a network code in which some or all code coefficients are chosen independently and uniformly over all elements of a finite field $\mathbb{F}_q$ (some coefficients can take fixed values as long as these values preserve feasibility[2]), the probability that all the receivers can decode the source processes is at least $(1 - d/q)^\nu$ for $q > d$, where $d$ is the number of receivers and $\nu$ is the maximum number of links receiving signals with independent randomized coefficients in any set of links constituting a flow solution from all sources to any receiver.* □

Randomized coding can strictly outperform routing in some distributed settings. For illustration, consider the problem of sending two processes from a source node to receiver nodes in random unknown locations on a rectangular grid network, using a distributed transmission scheme that does not involve

[1] Our model admits parallel links.
[2] i.e. the result holds for networks where not all nodes perform random coding, or where signals add by superposition on some channels Table 1: Success probabilities of randomized routing scheme RR and randomized coding scheme RC

| Receiver position | | (3,3) | (10,10) | (2,4) | (8,10) |
|---|---|---|---|---|---|
| RR | upper bound | 0.688 | 0.667 | 0.563 | 0.667 |
| RC | $\mathbb{F}_{2^4}$ lower bound | 0.597 | 0.098 | 0.597 | 0.126 |
| | $\mathbb{F}_{2^6}$ lower bound | 0.882 | 0.567 | 0.882 | 0.604 |
| | $\mathbb{F}_{2^8}$ lower bound | 0.969 | 0.868 | 0.969 | 0.882 | any communication between nodes or routing state. To maximize the probability that any receiver node will receive two distinct messages, the best that a node with two incoming links can do is to try to preserve message diversity by sending one incoming signal on one of its two outgoing links with equal probability, and the other signal on the remaining link. We derive combinatorially an upper bound on the routing success probability for a source-receiver pair in terms of their relative grid locations, which is surpassed by the corresponding lower bound for randomized coding in sufficiently large finite fields. These bounds are tabulated in Table 1.

Our lower bound on coding success probability applies for linearly correlated sources, for which the effect of randomized coding can be viewed as distributed compression occurring within the network rather than at the sources. For a feasible multicast connection problem and a randomized code of sufficient complexity, with high probability the information flowing across any cut will be sufficient to reconstruct the original source processes. In effect, the source information is being compressed to the capacity of any cut that it passes through. This is achieved without the need for any coordination among the source nodes, which is advantageous in distributed environments where such coordination is impossible or expensive.

Finally, we note that this approach achieves robustness in a way quite different from traditional approaches. Traditionally, compression is applied at source nodes so as to minimize required transmission rate and leave spare network capacity, and the addition of new sources may require re-routing of existing connections. Our approach fully utilizes available or allocated network capacity for maximal robustness, while retaining full flexibility to accommodate changes in network topology or addition of new sources.

REFERENCES

[1] R. Ahlswede, N. Cai, S.-Y.R. Li and R.W. Yeung, "Network Information Flow", IEEE-IT, vol. 46, pp. 1204-1216, 2000.

[2] T. Ho, D. R. Karger, M. Médard and R. Koetter, "Network Coding from a Network Flow Perspective ", ISIT 2003.

[3] R. Koetter and M. Médard, "An Algebraic Approach to Network Coding", IEEE/ACM Transactions on Networking, to appear.

[4] S. D. Servetto, G. Barrenechea. "Constrained Random Walks on Random Graphs: Routing Algorithms for Large Scale Wireless Sensor Networks", Proceedings of the 1st ACM International Workshop on Wireless Sensor Networks and Applications, 2002.

ANNEX A.2

The Benefits of Coding over Routing in a Randomized Setting

*Abstract*— We present a novel randomized coding approach for robust, distributed transmission and compression of information in networks. We give a lower bound on the success probability of a random network code, based on the form of transfer matrix determinant polynomials, that is tighter than the Schwartz-Zippel bound for general polynomials of the same total degree. The corresponding upper bound on failure probability is on the order of the inverse of the size of the finite field, showing that it can be made arbitrarily small by coding in a sufficiently large finite field, and that it decreases exponentially with the number of codeword bits.

We demonstrate the advantage of randomized coding over routing for distributed transmission in rectangular grid networks by giving, in terms of the relative grid locations of a source-receiver pair, an upper bound on routing success probability that is exceeded by a corresponding lower bound on coding success probability for sufficiently large finite fields.

We also show that our lower bound on the success probability of randomized coding holds for linearly correlated sources. This implies that randomized coding effectively compresses linearly correlated information to the capacity of any network cut in a feasible connection problem.

I. INTRODUCTION

In this paper we present a novel randomized coding approach for robust, distributed transmission and compression of information in networks, and demonstrate its advantages over routing-based approaches.

It is known that there exist cases where coding over networks enables certain connections that are not possible with just routing [1]. In this paper we investigate the benefits of coding over routing, not in terms of a taxonomy of network connection problems for which coding is necessary, but in a probabilistic, distributed setting. Distributed randomized routing has previously been consid- Tracey Ho and Muriel Médard are with the Laboratory for Information and Decision Systems, Massachusetts Institute of Technology, Cambridge, MA 02139, e-mail: {trace, medard}@mit.edu Ralf Koetter is with the Coordinated Science Laboratory, University of Illinois, Urbana, IL 61801, e-mail: koetter@csl.uiuc.edu David R. Karger is with the Laboratory for Computer Science, Massachusetts Institute of Technology, MA 02139, e-mail: karger@lcs.mit.edu Michelle Effros is with the Data Compression Laboratory, California Institute of Technology, Pasadena, CA 91125, e-mail: effros@caltech.edu ered for achieving robustness and path diversity with minimal state [5].

We give a lower bound on the success probability of a random network code, based on the form of transfer matrix determinant polynomials, that is tighter than the Schwartz-Zippel bound for general polynomials of the same total degree. The corresponding upper bound on failure probability is on the order of the inverse of the size of the finite field, showing that it can be made arbitrarily small by coding in a sufficiently large finite field, and that it decreases exponentially with the number of codeword bits. This suggests that random codes are potentially very useful for networks with unknown or changing topologies.

We demonstrate the advantage of randomized coding over routing for distributed transmission of multiple source processes in the case of rectangular grid networks. We provide an upper bound on the routing success probability for a source-receiver pair in terms of their relative grid locations, which is surpassed by the corresponding lower bound for randomized coding in sufficiently large finite fields.

Randomized coding also has connections with distributed data compression. We show that our lower bound on the success probability of randomized coding applies also for linearly correlated sources, which arise naturally in applications such as networks of sensors measuring the additive effects of multiple phenomena and noise. The effect of randomized coding on such sources can be viewed as distributed compression occuring within the network rather than at the sources. For a feasible multicast connection problem (i.e., one for which there exists some coding solution) and a randomized code of sufficient complexity, with high probability the information flowing across any cut will be sufficient to reconstruct the original source processes. In effect, the source information is being compressed to the capacity of any cut that it passes through. This is achieved without the need for any coordination among the source nodes, which is advantageous in distributed environments where such coordination is impossible or expensive.

Finally, we note that this randomized coding approach achieves robustness in a way quite different from traditional approaches. Traditionally, compression is applied at source nodes so as to minimize required transmission rate and leave spare network capacity, and the addition of new sources may require re-routing of existing connections. Our approach fully utilizes available or allocated network capacity for maximal robustness, while retaining full flexibility to accommodate changes in network topology or addition of new sources.

The paper is organized as follows: Section II describes our network model, Section III gives the main results, Section IV gives proofs and ancillary results, and Section V concludes the paper with a summary of the results and a discussion of further work.

II. MODEL

We adopt the model of [3], which represents a network as a directed graph $\mathcal{G}$. Discrete independent random processes $X_1, \ldots, X_r$ are observable at one or more source nodes, and there are $d \geq 1$ receiver nodes. The output processes at a receiver node $\beta$ are denoted $Z(\beta, i)$. The *multicast* connection problem is to transmit all the source processes to each of the receiver nodes.

There are $\nu$ links in the network. Link $l$ is an *incident outgoing link* of node $v$ if $v = \text{tail}(l)$, and an *incident incoming link* of $v$ if $v = \text{head}(l)$. We call an incident outgoing link of a source node a *source link* and an incident incoming link of a receiver node a *terminal link*. Edge $l$ carries the random process $Y(l)$.

The time unit is chosen such that the capacity of each link is one bit per unit time, and the random processes $X_i$ have a constant entropy rate of one bit per unit time. Edges with larger capacities are modelled as parallel edges, and sources of larger entropy rate are modelled as multiple sources at the same node.

The processes $X_i$, $Y(l)$, $Z(\beta, i)$ generate binary sequences. We assume that information is transmitted as vectors of bits which are of equal length $u$, represented as elements in the finite field $\mathbb{F}_{2^u}$. The length of the vectors is equal in all transmissions and all links are assumed to be synchronized with respect to the symbol timing.

In this paper we consider linear coding[1] on acyclic delay-free networks[2]. In a linear code, the signal $Y(j)$ on a link $j$ is a linear combination of processes $X_i$ generated at node $v = \text{tail}(j)$ and signals $Y(l)$ on incident incoming links $l$:

$$Y(j) = \sum_{\{i \,:\, X_i \text{ generated at } v\}} a_{i,j} X_i + \sum_{\{l \,:\, \text{head}(l) = v\}} f_{l,j} Y(l)$$

[1] which is sufficient for multicast [4]

[2] this algebraic framework can be extended to networks with cycles and delay by working in fields of rational functions in a delay variable [3]

and an output process $Z(\beta, i)$ at receiver node $\beta$ is a linear combination of signals on its terminal links:

$$Z(\beta, i) = \sum_{\{l \,:\, \text{head}(l) = \beta\}} b_{\beta_{i,l}} Y(l)$$

The coefficients $\{a_{i,j}, f_{l,j}, b_{\beta_{i,l}} \in \mathbb{F}_{2^u}\}$ can be collected into $r \times \nu$ matrices $A = (a_{i,j})$ and $B_\beta = (b_{\beta_{i,j}})$, and the $\nu \times \nu$ matrix $F = (f_{l,j})$, whose structure is constrained by the network. A triple $(A, F, B)$, where $$B = \begin{bmatrix} B_1 \\ \vdots \\ B_d \end{bmatrix}$$

specifies the behavior of the network, and represents a *linear network code*. We use the following notation:

- $G = (I - F)^{-1}$
- $G_\mathcal{H}$ is the submatrix consisting of columns of $G$ corresponding to links in set $\mathcal{H}$
- $\underline{a}_j$, $\underline{c}_j$ and $\underline{b}_j$ denote column $j$ of $A$, $AG$ and $B$ respectively

III. MAIN RESULTS

Reference [3] gives an algorithm for finding a linear coding solution to a given multicast problem, using knowledge of the entire network topology. In applications where communication is limited or expensive, it may be necessary or useful to determine each node's behavior in a distributed manner. We consider a randomized approach in which network nodes independently and randomly choose code coefficients from some finite field $\mathbb{F}_q$. The only management information needed by the receivers is the overall linear combination of source processes present in each of their incoming signals. This information can be maintained, for each signal in the network, as a vector in $\mathbb{F}_q^r$ of the coefficients of each of the source processes, and updated by each coding node applying the same linear combinations to the coefficient vectors as to the data.

Our first result gives a lower bound on the success rate of randomized coding over $\mathbb{F}_q$, in terms of the number of receivers and the number of links in the network. Because of the particular form of the product of transfer matrix determinant polynomials, the bound is tighter than the Schwartz-Zippel bound of of $d\nu/q$ for general polynomials of the same total degree.

*Theorem 1:* For a feasible multicast connection problem with independent or linearly correlated sources, and a network code in which some or all code coefficients are chosen independently and uniformly over all elements of a finite field $\mathbb{F}_q$ (some coefficients can take fixed values as long as these values preserve feasibility[3]), the probability that all the receivers can decode the source processes is at least $(1 - d/q)^\nu$ for $q > d$, where $d$ is the number of receivers and $\nu$ is the maximum number of links receiving signals with independent randomized coefficients in any set of links constituting a flow solution from all sources to any receiver. □

The complexity of the code grows as the logarithm of the field size $q = 2^u$, since arithmetic operations are performed on codewords of length $u$. The bound is on the order of the inverse of the field size, so the error probability decreases exponentially with the number of codeword bits $u$. For a fixed success probability, the field size needs to be on the order of the number of links $\nu$ multiplied by the number of receivers $d$.

An implication of this result for linearly correlated sources is that for a feasible multicast connection problem and a randomized code of sufficient complexity, with high probability the information passing through any source-receiver cut in the network contains the source information in a form that is compressed (or expanded) to the capacity of the cut.

Unlike random coding, if we consider only routing solutions (where different signals are not combined), then there are network connection problems for which the success probability of distributed routing is bounded away from 1.

Consider for example the problem of sending two processes from a source node to receiver nodes in random unknown locations on a rectangular grid network. Transmission to a particular receiver is successful if the receiver gets two different processes instead of duplicates of the same process. Suppose we wish to use a distributed transmission scheme that does not involve any communication between nodes or routing state (perhaps because of storage or complexity limitations of network nodes, or frequent shifting of receiver nodes). The best the network can aim for is to maximize the probability that any node will receive two distinct messages, by flooding in a way that preserves message diversity, for instance using the following scheme RR (ref Figure 1):

- The source node sends one process in both directions on one axis and the other process in both directions along the other axis.
- A node receiving information on one link sends the same information on its three other links (these are nodes along the grid axes passing through the source node).
- A node receiving signals on two links sends one of the incoming signals on one of its two other links with equal probability, and the other signal on the remaining link.

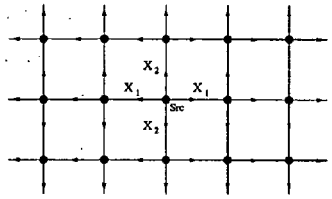

Fig. 1. Rectangular grid network.

Theorem 2: For the random routing scheme RR, the probability that a receiver located at grid position $(x, y)$ relative to the source receives both source processes is at most $$\frac{1 + 2^{||x|-|y||+1}(4^{\min(|x|,|y|)-1} - 1)/3}{2^{|x|+|y|-2}}$$

□

For comparison, we consider the same rectangular grid problem with the following simple random coding scheme RC (ref Figure 1):

- The source node sends one process in both directions on one axis and the other process in both directions along the other axis.
- A node receiving information on one link sends the same information on its three other links.
- A node receiving signals on two links sends a random linear combination of the source signals on each of its two other links.[4]

Theorem 3: For the random coding scheme RC, the probability that a receiver located at grid position $(x, y)$ relative to the source can decode both source processes is at least $(1 - 1/q)^{2(x+y-2)}$. □

Table III gives, for various values of $x$ and $y$, the values of the success probability bounds as well as some actual probabilities for routing when $x$ and $y$ are small. Note that an increase in grid size from $3 \times 3$ to $10 \times 10$ requires only an increase of two in codeword length to obtain success probability lower bounds close to 0.9, which are substantially better than the upper bounds for routing.

IV. PROOFS AND ANCILLARY RESULTS

We make use of the following result from our companion paper [2], which characterizes the feasibility of a multicast connection problem in terms of network flows:

---

[3] i.e. the result holds for networks where not all nodes perform random coding, or where signals add by superposition on some channels

[4] This simple scheme, unlike the randomized routing scheme RR, leaves out the optimization that each node receiving two linearly independent signals should always send out two linearly independent signals.

TABLE I
SUCCESS PROBABILITIES OF RANDOMIZED ROUTING SCHEME RR AND RANDOMIZED CODING SCHEME RC

| Receiver position | | (2,2) | (3,3) | (4,4) | (10,10) | (2,3) | (9,10) | (2,4) | (8,10) |
|---|---|---|---|---|---|---|---|---|---|
| RR | actual | 0.75 | 0.672 | 0.637 | - | 0.562 | - | 0.359 | - |
| | upper bound | 0.75 | 0.688 | 0.672 | 0.667 | 0.625 | 0.667 | 0.563 | 0.667 |
| RC | $F_{2^4}$ lower bound | 0.772 | 0.597 | 0.461 | 0.098 | 0.679 | 0.111 | 0.597 | 0.126 |
| | $F_{2^6}$ lower bound | 0.939 | 0.881 | 0.827 | 0.567 | 0.910 | 0.585 | 0.882 | 0.604 |
| | $F_{2^8}$ lower bound | 0.984 | 0.969 | 0.954 | 0.868 | 0.977 | 0.875 | 0.969 | 0.882 |

*Theorem 4:* A multicast connection problem is feasible (or a particular $(A, F)$ can be part of a valid solution) if and only if each receiver $\beta$ has a set $\mathcal{H}_\beta$ of $r$ incident incoming links for which $$P_{\mathcal{H}_\beta} = \sum_{\substack{\{\text{disjoint paths } \mathcal{E}_1, \ldots, \mathcal{E}_r : \\ \mathcal{E}_l \text{ from outgoing link} \\ l_i \text{ of source } i \text{ to } h_i \in \mathcal{H}_\beta\}}} |A_{\{l_1, \ldots, l_r\}}| \prod_{j=1}^{r} g(\mathcal{E}_j) \neq 0$$

where $A_{\{l_1,\ldots,l_r\}}$ is the submatrix of $A$ consisting of columns corresponding to links $\{l_1, \ldots, l_r\}$. The sum is over all flows that transmit all source processes to links in $\mathcal{H}_\beta$, each flow being a set of $r$ disjoint paths each connecting a different source to a different link in $\mathcal{H}_\beta$. □

*Corollary 1:* The polynomial $P_\beta$ for each receiver has maximum degree $\nu$ and is linear in variables $\{a_{x,j}, f_{i,j}\}$. The product of $d$ such polynomials has maximum degree $d\nu$, and the largest exponent of any variable $\{a_{x,j}, f_{i,j}\}$ is at most $d$. □

The particular form given in Corollary 1 of the product of determinant polynomials gives rise to a tighter bound on its probability of being zero when its variables take random values from a finite field $\mathbb{F}_q$, as compared to the Schwartz-Zippel bound of $d\nu/q$ for a general $d\nu$-degree multivariate polynomial.

*Lemma 1:* Let $P$ be a polynomial of degree less than or equal to $d\nu$, in which the largest exponent of any variable is at most $d$. The probability that $P$ equals zero is at most $1 - (1 - d/q)^\nu$ for $d < q$.

*Proof:* For any variable $\xi_1$ in $P$, let $d_1$ be the largest exponent of $\xi_1$ in $P$. Express $P$ in the form $P = \xi_1^{d_1} P_1 + R_1$, where $P_1$ is a polynomial of degree at most $d\nu - d_1$ that does not contain variable $\xi_1$, and $R_1$ is a polynomial in which the largest exponent of $\xi_1$ is less than $d_1$. By the Principle of Deferred Decisions, the probability $\Pr[P = 0]$ is unaffected if we set the value of $\xi_1$ last after all the other coefficients have been set. If, for some choice of the other coefficients, $P_1 \neq 0$, then $P$ becomes a polynomial of degree $d_1$ in $\xi_1$. By the Schwartz-Zippel Theorem, this probability $\Pr[P = 0 | P_1 \neq 0]$ is upper bounded by $d_1/q$. So $$\Pr[P = 0] \leq \Pr[P_1 \neq 0]\frac{d_1}{q} + \Pr[P_1 = 0]$$

$$= \Pr[P_1 = 0]\left(1 - \frac{d_1}{q}\right) + \frac{d_1}{q} \quad (1)$$

Next we consider $\Pr[P_1 = 0]$, choosing any variable $\xi_2$ in $P_1$ and letting $d_2$ be the largest exponent of $\xi_2$ in $P_1$. We express $P_1$ in the form $P_1 = \xi_2^{d_2} P_2 + R_2$, where $P_2$ is a polynomial of degree at most $d\nu - d_1 - d_2$ that does not contain variable $\xi_2$, and $R_2$ is a polynomial in which the largest exponent of $\xi_2$ is less than $d_2$. Proceeding similarly, we assign variables $\xi_i$ and define $d_i$ and $P_i$ for $i = 3, 4, \ldots$ until we reach $i = k$ where $P_k$ is a constant and $\Pr[P_k = 0] = 0$. Note that $1 \leq d_i \leq d < q \,\forall\, i$ and $\sum_{i=1}^{k} d_i \leq d\nu$, so $k \leq d\nu$. Applying Schwartz-Zippel as before, we have for $k' = 1, 2, \ldots, k$ $$Pr[P_{k'} = 0] \leq Pr[P_{k'+1} = 0]\left(1 - \frac{d_{k'+1}}{q}\right) + \frac{d_{k'+1}}{q} \quad (2)$$

Combining all the inequalities recursively, we can show by induction that $$\Pr[P = 0] \leq \frac{\sum_{i=1}^{k} d_i}{q} - \frac{\sum_{i \neq j} d_i d_j}{q^2} + \ldots$$
$$+ (-1)^{k-1}\frac{\prod_{i=1}^{k} d_i}{q^k}$$

where $0 \leq d\nu - \sum_{i=1}^{k} d_i$.

Now consider the integer optimization problem

Maximize $f = \frac{\sum_{i=1}^{d\nu} d_i}{q} - \frac{\sum_{i \neq j} d_i d_j}{q^2} + \ldots$
$$+ (-1)^{d\nu-1}\frac{\prod_{i=1}^{d\nu} d_i}{q^{d\nu}}$$

subject to $0 \leq d_i \leq d < q \,\forall\, i \in [1, d\nu],$ $$\sum_{i=1}^{d\nu} d_i \leq d\nu, \text{ and } d_i \text{ integer} \quad (3)$$

whose maximum is an upper bound on $\Pr[P = 0]$.

We first consider the non-integer relaxation of the problem. Let $\underline{d}^* = \{d_1^*, \ldots, d_{d\nu}^*\}$ be an optimal solution.

For any set $S_h$ of $h$ distinct integers from $[1, d\nu]$, let $f_{S_h} = 1 - \frac{\sum_{i \in S_h} d_i}{q} + \frac{\sum_{i,j \in S_h, i \neq j} d_i d_j}{q^2} - \ldots +$ $(-1)^h \frac{\prod_{i \in S_h} d_i}{q^h}$. We can show by induction on $h$ that $0 < f_{S_h} < 1$ for any set $S_h$ of $h$ distinct integers in $[1, d\nu]$.

If $\sum_{i=1}^{d\nu} d_i^* < d\nu$, then there is some $d_i^* < d$, and there exists a feasible solution $\underline{d}$ such that $d_i = d_i^* + \epsilon, \epsilon > 0$, and $d_h = d_h^*$ for $h \neq i$, which satisfies $$f(\underline{d}) - f(\underline{d}^*) = \frac{\epsilon}{q}\left(1 - \frac{\sum_{h \neq i} d_h^*}{q} + \ldots + (-1)^{d\nu-1}\frac{\prod_{h \neq i} d_h^*}{q^{d\nu-1}}\right)$$

This is positive, contradicting the optimality of $\underline{d}^*$.

Next suppose $0 < d_i^* < d$ for some $d_i^*$. Then there exists some $d_j^*$ such that $0 < d_j^* < d$, since if $d_j^* = 0$ or $d$ for all other $j$, then $\sum_{i=1}^{d\nu} d_i^* \neq d\nu$. Assume without loss of generality that $0 < d_i^* \leq d_j^* < d$. Then there exists a feasible vector $\underline{d}$ such that $d_i = d_i^* - \epsilon$, $d_j = d_j^* + \epsilon$, $\epsilon > 0$, and $d_h = d_h^*$ $\forall h \neq i, j$, which satisfies $$f(\underline{d}) - f(\underline{d}^*) = -\left(\frac{(d_i^* - d_j^*)\epsilon - \epsilon^2}{q^2}\right)$$
$$\left(1 - \frac{\sum_{h \neq i,j} d_h^*}{q} - \ldots + (-1)^{d\nu-2}\frac{\prod_{h \neq i,j} d_h^*}{q^{d\nu-2}}\right)$$

This is again positive, contradicting the optimality of $\underline{d}^*$.

Thus, $\sum_{i=1}^{d\nu} d_i^* = d\nu$, and $d_i^* = 0$ or $d$. So exactly $\nu$ of the variables $d_i^*$ are equal to $d$. Since the optimal solution is an integer solution, it is also optimal for the integer program (3). The corresponding optimal $f = \nu \frac{d}{q} - \binom{\nu}{2}\frac{d^2}{q^2} + \ldots + (-1)^{\nu-1}\frac{d^\nu}{q^\nu} = 1 - \left(1 - \frac{d}{q}\right)^\nu$. ∎

*Proof of Theorem 1:* By Corollary 1, the product $\prod_\beta P_\beta$ has degree at most $d\nu$, and the largest exponent of any variable $a_{x,j}$ or $f_{i,j}$ is at most $d$. These properties still hold if some variables are set to deterministic values which do not make the product identically zero.

Linearly correlated sources can be viewed as prespecified linear combinations of underlying independent processes. Unlike the independent sources case where each nonzero entry of the $A$ matrix can be set independently, in this case there are linear dependencies among the entries. The columns $\underline{a}_j$ of the $A$ matrix are linear functions $\underline{a}_j = \sum_k \alpha_j^k \underline{v}_j^k$ of column vectors $\underline{v}_j^k$ that represent the composition of the source processes at tail($j$) in terms of the underlying independent processes. Variables $\alpha_j^k$ in column $\underline{a}_j$ can be set independently of variables $\alpha_{j'}^k$ in other columns $\underline{a}_{j'}$. It can be seen from Theorem 4 that for any particular $j$, each product term in the polynomial $P_\beta$ for any receiver $\beta$ contains at most one variable $a_{i,j} = \sum_k \alpha_j^k v_{i,j}^k$. $P_\beta$ is thus linear in the variables $\alpha_j^k$, and also in variables $f_{i,j}$, which are unaffected by the source correlations. So any variable in the product of $d$ such polynomials has maximum exponent $d$.

Applying Lemma 1 gives us the required bound.

For the single-receiver case, the bound is attained for a network consisting only of links forming a single set of $r$ disjoint source-receiver paths. ∎

*Proof of Theorem 2:* To simplify notation, we assume without loss of generality that the axes are chosen such that the source is at $(0,0)$, and $0 < x \leq y$. Let $E_{x,y}$ be the event that two different signals are received by a node at grid position $(x, y)$ relative to the source. The statement of the lemma is then $$\Pr[E_{x,y}] \leq \left(1 + 2^{y-x+1}(4^{x-1} - 1)/3\right)/2^{y+x-2} \quad (4)$$

which we prove by induction.

Let $Y_{x,y}^h$ denote the signal carried on the link between $(x-1, y)$ and $(x, y)$ and let $Y_{x,y}^v$ denote the signal carried on the link between $(x, y-1)$ and $(x, y)$ (ref Figure 2).

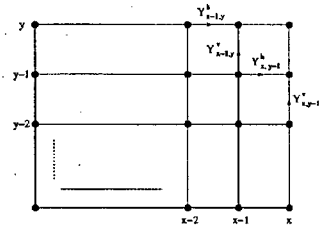

Fig. 2. Rectangular grid network. $Y_{x,y}^h$ denotes the signal carried on the link between $(x-1, y)$ and $(x, y)$, and $Y_{x,y}^v$ denotes the signal carried on the link between $(x, y-1)$ and $(x, y)$.

Observe that $\Pr[E_{x,y}|E_{x-1,y}] = 1/2$, since with probability $1/2$ node $(x-1, y)$ transmits to node $(x, y)$ the signal complementary to whatever signal is being transmitted from node $(x, y-1)$. Similarly, $\Pr[E_{x,y}|E_{x,y-1}] = 1/2$, so $\Pr[E_{x,y}|E_{x-1,y} \text{ or } E_{x,y-1}] = 1/2$.

Case 1: $E_{x-1,y-1}$.

Case 1a: $Y_{x-1,y}^h \neq Y_{x,y-1}^v$. If $Y_{x-1,y}^v \neq Y_{x-1,y}^h$, then $\overline{E}_{x,y-1} \cup \overline{E}_{x-1,y}$, and if $Y_{x,y-1}^v = Y_{x,y-1}^h$, then $\overline{E}_{x,y-1} \cup \overline{E}_{x-1,y}$. So $\Pr[E_{x,y}|\text{ Case 1a}] = \frac{1}{2} \times \frac{1}{2} + \frac{1}{2} = \frac{3}{4}$.

Case 1b: $Y_{x-1,y}^h = Y_{x,y-1}^v$. Either $E_{x,y-1} \cup \overline{E}_{x-1,y}$ or $\overline{E}_{x,y-1} \cup E_{x-1,y}$, so $\Pr[E_{x,y}|\text{ Case 1b}] = 1/2$.

Case 2: $\overline{E}_{x-1,y-1}$

Case 2a: $Y_{x-1,y}^h \neq Y_{x,y-1}^v$. Either $E_{x,y-1} \cup \overline{E}_{x-1,y}$ or $\overline{E}_{x,y-1} \cup E_{x-1,y}$, so $\Pr[E_{x,y}|\text{ Case 2a}] = 1/2$.

Case 2b: $Y_{x-1,y}^h = Y_{x,y-1}^v = Y_{x-1,y-1}^h$. By the assumption of case 2, $Y_{x,y-1}^v$ is also equal to this same signal, and $\Pr[E_{x,y}|\text{ Case 2b}] = 0$.

Case 2c: $Y^h_{x-1,y} = Y^v_{x,y-1} \neq Y^h_{x-1,y-1}$. Then $E_{x,y-1}$ and $E_{x-1,y}$, so $\Pr[E_{x,y}|$ Case 2c$] = 1/2$.

So $$\Pr[E_{x,y}|E_{x-1,y-1}] \leq \max\left(\Pr[E_{x,y}|\text{ Case 1a}], \Pr[E_{x,y}|\text{ Case 1b}]\right) = 3/4$$

$$\Pr[E_{x,y}|\overline{E}_{x-1,y-1}] \leq \max\left(\Pr[E_{x,y}|\text{ Case 2a}], \Pr[E_{x,y}|\text{ Case 2b}], \Pr[E_{x,y}|\text{ Case 2c}]\right) = 1/2$$

$$\Pr[E_{x,y}] \leq \frac{3}{4}\Pr[E_{x-1,y-1}] + \frac{1}{2}\Pr[\overline{E}_{x-1,y-1}]$$

$$= \frac{1}{2} + \frac{1}{4}\Pr[E_{x-1,y-1}]$$

If Equation 4 holds for some $(x, y)$, then it also holds for $(x+1, y+1)$:

$$\Pr[E_{x+1,y+1}] \leq \frac{1}{2} + \frac{1}{4}\Pr[E_{x,y}]$$

$$= \frac{1}{2} + \frac{1}{4}\left(\frac{1 + 2^{y-x+1}(1 + 4 + \ldots + 4^{x-2})}{2^{y+x-2}}\right)$$

$$= \frac{1 + 2^{y-x+1}(4^x - 1)/3}{2^{y+1+x+1-2}}$$

Now $\Pr[E_{1,y'}] = 1/2^{y'-1}$, since there are $y' - 1$ nodes, $(1, 1), \ldots, (1, y' - 1)$, at which one of the signals is eliminated with probability $1/2$. Setting $y' = y - x + 1$ gives the base case which completes the induction. ∎

*Proof of Theorem 3:* We first establish the degree of the transfer matrix determinant polynomial $P_\beta$ for a receiver $\beta$ at $(x, y)$, in the indeterminate variables $f_{i,j}$. By Theorem 4, $P_\beta$ is a linear combination of product terms of the form $a_{1,l_1} a_{2,l_2} f_{i_1,l_3} \cdots f_{i_t,l_k}$, where $\{l_1, \ldots, l_k\}$ is a set of distinct links forming two disjoint paths from the source to the receiver. In the random coding scheme we consider, the only randomized variables are the $f_{i,j}$ variables at nodes receiving information on two links. The maximum number of such nodes on a source-receiver path is $x + y - 2$, so the total degree of $P_\beta$ is $2(x+y-2)$. Applying the random coding bound of Lemma 1 yields the result. ∎

V. Conclusions and further work

We have presented a novel randomized coding approach for robust, distributed transmission and compression of information in networks, giving an upper bound on failure probability that decreases exponentially with codeword length. We have demonstrated the advantages of randomized coding over randomized routing in rectangular grid networks, by giving an upper bound on the success probability of a randomized routing scheme that is exceeded by the corresponding lower bound for a simple randomized coding scheme in sufficiently large finite fields.

We have also shown that randomized coding has the same success bound for linearly correlated sources, with the implication that randomized coding effectively compresses correlated information to the capacity of any cut that it passes through.

Finally, we note that this randomized coding approach offers a new paradigm for achieving robustness, by spreading information over available network capacity while retaining maximum flexibility to accommodate changes in the network.

Several areas of further research spring from this work. One such area is to study more sophisticated randomized coding schemes on various network topologies, and to compare their performance and management overhead with that of deterministic schemes. Another area would be to extend our results to sources with arbitrary correlations and networks with cycles and delay.

References

[1] R. Ahlswede, N. Cai, S.-Y.R. Li and R.W. Yeung, "Network Information Flow", IEEE-IT, vol. 46, pp. 1204-1216, 2000.

[2] T. Ho, D. R. Karger, M. Médard and R. Koetter, "Network Coding from a Network Flow Perspective", Submitted to the 2003 IEEE International Symposium on Information Theory.

[3] R. Koetter and M. Médard, "Beyond Routing: An Algebraic Approach to Network Coding", Proceedings of the 2002 IEEE Infocom, 2002.

[4] S.-Y.R. Li and R.W. Yeung, "Linear Network Coding", preprint, 1999.

[5] S. D. Servetto, G. Barrenechea. "Constrained Random Walks on Random Graphs: Routing Algorithms for Large Scale Wireless Sensor Networks", Proceedings of the 1st ACM International Workshop on Wireless Sensor Networks and Applications, 2002.

ANNEX A3

On Randomized Network Coding

Abstract

We consider a randomized network coding approach for multicasting from several sources over a network, in which nodes independently and randomly select linear mappings from inputs onto output links over some field. This approach was first described in [3], which gave, for acyclic delay-free networks, a bound on error probability, in terms of the number of receivers and random coding output links, that decreases exponentially with code length. The proof was based on a result in [2] relating algebraic network coding to network flows. In this paper, we generalize these results to networks with cycles and delay. We also show, for any given acyclic network, a tighter bound in terms of the probability of connection feasibility in a related network problem with unreliable links. From this we obtain a success probability bound for randomized network coding in link-redundant networks with unreliable links, in terms of link failure probability and amount of redundancy.

1 Introduction

We consider a randomized network coding approach for distributed transmission and compression of information in multi-input multicast networks. This family of problems includes traditional single-source multicast for content delivery, and the reachback problem for sensor networks, in which several, possibly correlated, sources transmit to a single receiver.

In this approach, first described in [3], each link carries a linear combination of signals from incident incoming links. The linear coefficients for each link are independently and randomly chosen from some finite field. The receivers need only know the overall linear combination of source processes in each of their incoming signals. This information can be sent through the network as a vector, for each signal, of coefficients corresponding to each of the source processes, updated at each coding node by applying the same linear mappings to the coefficient vectors as to the information signals.

Reference [3] considered independent or linearly correlated sources on acyclic delay-free networks, and showed an upper bound on error probability that decreases exponentially with the length of the codes. The proof was based on results in [2] linking multicast network coding to network flows/bipartite matching. It was noted that this approach achieves robust routing and compression in combination within the network, differing from traditional approaches which first do source/diversity coding followed by routing of coded information. Any available network capacity can be fully exploited for robustness to link failures and coding error, while not hampering accommodation of new multicast sources.

In this paper, we generalize these results to networks with cycles and delay. We also show, for acyclic networks, a relation between the probability of randomized coding success and the probability of connection feasibility in a related network problem with unreliable links. This result is useful for obtaining tighter bounds on randomized coding success probability that are based on more specific network characteristics. From it we obtain a tighter bound for link-redundant networks with unreliable links, in terms of link failure probability and amount of redundancy, showing how these factors affect randomized coding success probability.

Going from the acyclic delay-free case to the case with cycles and delay, the scalar coefficients of the linear combinations become polynomials in a delay variable. The number of terms of these polynomials that must be sent, and the memory required at the receivers, depend on the number of links involved in cycles (memory registers) in the network. For less frequently changing networks, instead of sending coefficient vectors through the network, there can be a phase in which the sources take turns to each send a unit impulse through the network.

1.1 Overview

A brief overview of related work is given in Section 1.2. In Section 2, we provide the algebraic model we consider for our networks. Our main results are given in 3, and our proofs and ancillary results in Section 4. We present our conclusions and some directions for further work in Section 5.

1.2 Related Work

Ahlswede et al. [1] showed that with network coding, as symbol size approaches infinity, a source can multicast information at a rate approaching the smallest minimum cut between the source and any receiver. Li et al. [6] showed that linear coding with finite symbol size is sufficient for multicast. Koetter and Médard [5] presented an algebraic framework for network coding that recaptured previous results and gave an algebraic condition for checking the validity of a given linear multicast code. Sanders et al. [7] and Jaggi et al. [4] proposed centralized algorithms for single source multicast using a subgraph consisting of flow solutions to individual receivers, and showed that randomization with centralized testing could yield computational advantage.

2 Model

We adopt the model of [5], which represents a network as a directed graph $\mathcal{G}$. Discrete independent random processes $X_1, \ldots, X_r$ are observable at one or more source nodes, and there are $d \geq 1$ receiver nodes. The output processes at a receiver node $\beta$ are denoted $Z(\beta, i)$. The *multicast* connection problem is to transmit all the source processes to each of the receiver nodes.

There are $\nu$ links in the network. Link $l$ is an *incident outgoing link* of node $v$ if $v = \text{tail}(l)$, and an *incident incoming link* of $v$ if $v = \text{head}(l)$. We call an incident outgoing link of a source node a *source link* and an incident incoming link of a receiver node a *terminal link*. Edge $l$ carries the random process $Y(l)$.

The time unit is chosen such that the capacity of each link is one bit per unit time, and the random processes $X_i$ have a constant entropy rate of one bit per unit time. Edges with larger capacities are modelled as parallel edges, and sources of larger entropy rate are modelled as multiple sources at the same node.

The processes $X_i$, $Y(l)$, $Z(\beta, i)$ generate binary sequences. We assume that information is transmitted as vectors of bits which are of equal length $u$, represented as elements in the finite field $\mathbb{F}_{2^u}$. The length of the vectors is equal in all transmissions and all links are assumed to be synchronized with respect to the symbol timing. In this paper we consider linear coding[1]. For a linear code, the signal $Y(j)$ on a link $j$ is a linear combination of processes $X_i$ generated at node $v = \text{tail}(j)$ and signals $Y(l)$ on incident incoming links $l$. For the delay-free case, this is represented by the equation $$Y(j) = \sum_{\{i\,:\,X_i \text{ generated at } v\}} a_{i,j} X_i + \sum_{\{l\,:\,\text{head}(l) = v\}} f_{l,j} Y(l)$$

and an output process $Z(\beta, i)$ at receiver node $\beta$ is a linear combination of signals on its terminal links, represented as $$Z(\beta, i) = \sum_{\{l\,:\,\text{head}(l) = \beta\}} b_{\beta_i, l} Y(l)$$

For multicast on a network with link delays, memory is needed at the receiver nodes, but memoryless operation suffices at all other nodes [5]. We consider unit delay links, modeling links with longer delay as links in series. The corresponding linear coding equations are $$Y_{t+1}(j) = \sum_{\{i\,:\,X_i \text{ generated at } v\}} a_{i,j} X_{it} + \sum_{\{l\,:\,\text{head}(l) = v\}} f_{l,j} Y_t(l) \qquad (1)$$

$$Z_{t+1}(\beta, i) = \sum_{\{l\,:\,\text{head}(l) = \beta\}} \sum_{u=t-\mu}^{t} b_{\beta_i, l_{t-u}} Y_u(l) \qquad (2)$$

where $\mu$ represents the memory required.

The coefficients $\{a_{i,j}, f_{l,j}, b_{\beta_i, l} \in \mathbb{F}_{2^u}\}$ can be collected into $r \times \nu$ matrices $A = (a_{i,j})$ and $B_\beta = (b_{\beta_{i,j}})$, and the $\nu \times \nu$ matrix $F = (f_{l,j})$, whose structure is constrained by the network. For acyclic graphs, we number the links ancestrally, i.e. lower-numbered links upstream of higher-numbered links, so matrix $F$ is upper triangular with zeros on the diagonal. A triple $(A, F, B)$, where $$B = \begin{bmatrix} B_1 \\ \vdots \\ B_d \end{bmatrix}$$

specifies the behavior of the network, and represents a *linear network code*. We use the following notation:

---

[1] which is sufficient for multicast [6]

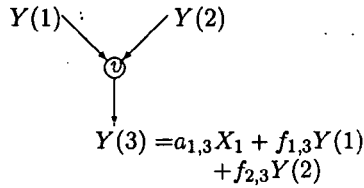

Figure 1: Illustration of linear coding at a node.

- $G = \begin{cases} (I - F)^{-1} \text{ in the acyclic delay-free case}^2 \\ (I - DF)^{-1} \text{ in the case with delay}^3 \end{cases}$

- $G_{\mathcal{H}}$ is the submatrix consisting of columns of $G$ corresponding to links in set $\mathcal{H}$

- $\underline{a}_j$, $\underline{c}_j$ and $\underline{b}_j$ denote column $j$ of $A$, $AG$ and $B$ respectively Matrix $AG$ gives the transfer matrix from input processes to signals on each link; the connection problem is feasible if and only if $AGB_\beta^T$ has full rank for each receiver $\beta$ [5].

3 Main Results

We generalize results presented in [2, 3] to arbitrary graphs which may have cycles and delay.

Theorem 1 *For a feasible multicast connection problem on a (possibly cyclic) network with unit delay links, independent or linearly correlated sources, and a network code in which some or all code coefficients are chosen independently and uniformly over all elements of a finite field $\mathbb{F}_q$ (some coefficients can take fixed values as long as these values preserve feasibility$^4$), the probability that all the receivers can decode the source processes is at least $(1 - d/q)^\eta$ for $q > d$, where $d$ is the number of receivers and $\eta$ is the number of links carrying random combinations of source processes and/or incoming signals.*

The proof of the above theorem relies on the following result, which allows us to easily characterize the dependence of the transfer matrix determinant on the random coefficients.

Theorem 2 *For an arbitrary (possibly cyclic) network with unit delay links, the transfer matrix $A(I - DF)^{-1}B_\beta^T$ for receiver $\beta$ in a network code $(A, F, B)$ is nonsingular if and only if the corresponding Edmonds matrix $\begin{bmatrix} A & 0 \\ I - DF & B_\beta^T \end{bmatrix}$ is nonsingular.*

The bound in Theorem 1 is a very general one, applying across all networks with the same number of receivers and the same number of links with independently chosen random linear mappings. Our next goal is to find tighter bounds by taking into account more specific network characteristics. To this end, we establish a connection between randomized coding success probability and network connection feasibility when links are ---
$^2$The inverse exists since $F$ is nilpotent.

$^3$The inverse exists since the determinant is a nonzero polynomial in $D$.

$^4$i.e. the result holds for networks where not all nodes perform random coding, or where signals add by superposition on some channels unreliable, for acyclic networks with or without link delays. This is useful for cases where analysis of connection feasibility is easier than direct analysis of randomized coding, for example in the case of networks with unreliable links and excess capacity.

Theorem 3 *For a d-receiver multicast problem on an acyclic network, the success probability of a random network code in the field of size q is greater than or equal to the probability that the network connections remain feasible after deleting each link of the original graph with probability d/q.*

Theorem 4 *For a connection problem with r sources and links with failure probability p, let y be the minimum redundancy, i.e. deletion of any y links in the network preserves feasibility. A lower bound on the probability that a particular receiver receives all processes is*

$$\sum_{x=r}^{r+y} \binom{r+y}{x} \left(1-p-\frac{1-p}{q}\right)^{Lx} \left(1-\left(1-p-\frac{1-p}{q}\right)^{L}\right)^{r+y-x}$$

*where L is the longest source-receiver path in the network.*

4 Proofs and Ancillary Results

4.1 Randomized Network Coding on Arbitrary Graphs with Delay

*Proof of Theorem 2:* Note that $$\begin{bmatrix} I & -A(I-DF)^{-1} \\ 0 & I \end{bmatrix} \begin{bmatrix} A & 0 \\ I-DF & B_\beta^T \end{bmatrix} = \begin{bmatrix} 0 & -A(I-DF)^{-1}B_\beta^T \\ I-DF & B_\beta^T \end{bmatrix}$$

The first matrix, $\begin{bmatrix} I & -A(I-DF)^{-1} \\ 0 & I \end{bmatrix}$, has determinant 1. So $\det\left(\begin{bmatrix} A & 0 \\ I-DF & B_\beta^T \end{bmatrix}\right)$ equals $\det\left(\begin{bmatrix} 0 & -A(I-DF)^{-1}B_\beta^T \\ I-DF & B_\beta^T \end{bmatrix}\right)$, which can be expanded as follows:

$$\det\left(\begin{bmatrix} 0 & -A(I-DF)^{-1}B_\beta^T \\ I-DF & B_\beta^T \end{bmatrix}\right)$$
$$= (-1)^{r\nu}\det\left(\begin{bmatrix} -A(I-DF)^{-1}B_\beta^T & 0 \\ B_\beta & I-DF \end{bmatrix}\right)$$
$$= (-1)^{r\nu}\det(-A(I-DF)^{-1}B_\beta^T)\det(I-DF)$$
$$= (-1)^{r(\nu+1)}\det(A(I-DF)^{-1}B_\beta^T)\det(I-DF)$$

Since $\det(I-DF)$ is nonzero, the result follows. ∎

Lemma 1 *The determinant polynomial of the Edmonds matrix* $\begin{bmatrix} A & 0 \\ I-DF & B_\beta^T \end{bmatrix}$ *associated with a network code $(A, F, B)$ in a network with delay is a polynomial in delay variable D, whose coefficients have maximum degree $\nu$ in variables $\{a_{x,j}, f_{i,j}\}$, and are linear in each variable $\{a_{x,j}, f_{i,j}\}$.*

*Proof:* Each variable $\{a_{x,j}, f_{i,j}, b_{x,j}\}$ appears in only one entry of the Edmonds matrix. The determinant can be written as the sum of products of $r + \nu$ entries, one from each row and column. Each such product is linear in each variable $\{a_{x,j}, f_{i,j}, b_{x,j}\}$, has degree at most $r + \nu$ in variables $\{a_{x,j}, f_{i,j}, b_{x,j}\}$, and has degree $r$ in variables $\{b_{x,j}\}$. ∎

Lemma 2 *Let $P$ be a polynomial in $\mathbb{F}[\xi_1, \xi_2, \ldots]$ of degree less than or equal to $d\eta$, in which the largest exponent of any variable $\xi_i$ is at most $d$. Values for $\xi_1, \xi_2, \ldots$ are chosen independently and uniformly at random from $\mathbb{F}_q \subseteq \mathbb{F}$. The probability that $P$ equals zero is at most $1 - (1 - d/q)^\eta$ for $d < q$.*

*Proof:* For any variable $\xi_1$ in $P$, let $d_1$ be the largest exponent of $\xi_1$ in $P$. Express $P$ in the form $P = \xi_1^{d_1} P_1 + R_1$, where $P_1$ is a polynomial of degree at most $d\eta - d_1$ that does not contain variable $\xi_1$, and $R_1$ is a polynomial in which the largest exponent of $\xi_1$ is less than $d_1$. By the Principle of Deferred Decisions, the probability $\Pr[P = 0]$ is unaffected if we set the value of $\xi_1$ last after all the other coefficients have been set. If, for some choice of the other coefficients, $P_1 \neq 0$, then $P$ becomes a polynomial in $\mathbb{F}[\xi_1]$ of degree $d_1$. By the Schwartz-Zippel Theorem, this probability $\Pr[P = 0 | P_1 \neq 0]$ is upper bounded by $d_1/q$. So $$\Pr[P = 0] \leq \Pr[P_1 \neq 0]\frac{d_1}{q} + \Pr[P_1 = 0]$$
$$= \Pr[P_1 = 0]\left(1 - \frac{d_1}{q}\right) + \frac{d_1}{q} \quad (3)$$

Next we consider $\Pr[P_1 = 0]$, choosing any variable $\xi_2$ in $P_1$ and letting $d_2$ be the largest exponent of $\xi_2$ in $P_1$. We express $P_1$ in the form $P_1 = \xi_2^{d_2} P_2 + R_2$, where $P_2$ is a polynomial of degree at most $d\eta - d_1 - d_2$ that does not contain variables $\xi_1$ or $\xi_2$, and $R_2$ is a polynomial in which the largest exponent of $\xi_2$ is less than $d_2$. Proceeding similarly, we assign variables $\xi_i$ and define $d_i$ and $P_i$ for $i = 3, 4, \ldots$ until we reach $i = k$ where $P_k$ is a constant and $\Pr[P_k = 0] = 0$. Note that $1 \leq d_i \leq d < q \,\forall\, i$ and $\sum_{i=1}^{k} d_i \leq d\eta$, so $k \leq d\eta$. Applying Schwartz-Zippel as before, we have for $k' = 1, 2, \ldots, k$ $$Pr[P_{k'} = 0] \leq Pr[P_{k'+1} = 0]\left(1 - \frac{d_{k'+1}}{q}\right) + \frac{d_{k'+1}}{q} \quad (4)$$

Combining all the inequalities recursively, we can show by induction that $$\Pr[P = 0] \leq \frac{\sum_{i=1}^{k} d_i}{q} - \frac{\sum_{i \neq j} d_i d_j}{q^2} + \ldots + (-1)^{k-1}\frac{\prod_{i=1}^{k} d_i}{q^k}$$

where $0 \leq d\eta - \sum_{i=1}^{k} d_i$.

Now consider the integer optimization problem $$\text{Maximize} \quad f = \frac{\sum_{i=1}^{d\eta} d_i}{q} - \frac{\sum_{i \neq j} d_i d_j}{q^2} + \ldots + (-1)^{d\eta - 1}\frac{\prod_{i=1}^{d\eta} d_i}{q^{d\eta}}$$

$$\text{subject to} \quad 0 \leq d_i \leq d < q \,\forall\, i \in [1, d\eta],$$

$$\sum_{i=1}^{d\eta} d_i \leq d\eta, \text{ and } d_i \text{ integer} \quad (5)$$

whose maximum is an upper bound on $\Pr[P = 0]$.

We first consider the non-integer relaxation of the problem. Let $\underline{d}^* = \{d_1^*, \ldots, d_{d\eta}^*\}$ be an optimal solution.

For any set $S_h$ of $h$ distinct integers from $[1, d\eta]$, let $f_{S_h} = 1 - \frac{\sum_{i \in S_h} d_i}{q} + \frac{\sum_{i,j \in S_h, i \neq j} d_i d_j}{q^2} - \ldots + (-1)^h \frac{\prod_{i \in S_h} d_i}{q^h}$. We can show by induction on $h$ that $0 < f_{S_h} < 1$ for any set $S_h$ of $h$ distinct integers in $[1, d\eta]$.

If $\sum_{i=1}^{d\eta} d_i^* < d\eta$, then there is some $d_i^* < d$, and there exists a feasible solution $\underline{d}$ such that $d_i = d_i^* + \epsilon$, $\epsilon > 0$, and $d_h = d_h^*$ for $h \neq i$, which satisfies $$f(\underline{d}) - f(\underline{d}^*) = \frac{\epsilon}{q}\left(1 - \frac{\sum_{h \neq i} d_h^*}{q} + \ldots + (-1)^{d\eta-1} \frac{\prod_{h \neq i} d_h^*}{q^{d\eta-1}}\right)$$

This is positive, contradicting the optimality of $\underline{d}^*$.

Next suppose $0 < d_i^* < d$ for some $d_i^*$. Then there exists some $d_j^*$ such that $0 < d_j^* < d$, since if $d_j^* = 0$ or $d$ for all other $j$, then $\sum_{i=1}^{d\eta} d_i^* \neq d\eta$. Assume without loss of generality that $0 < d_i^* \leq d_j^* < d$. Then there exists a feasible vector $\underline{d}$ such that $d_i = d_i^* - \epsilon$, $d_j = d_j^* + \epsilon$, $\epsilon > 0$, and $d_h = d_h^* \; \forall \; h \neq i, j$, which satisfies $$f(\underline{d}) - f(\underline{d}^*) = -\left(\frac{(d_i^* - d_j^*)\epsilon - \epsilon^2}{q^2}\right)\left(1 - \frac{\sum_{h \neq i,j} d_h^*}{q} - \ldots + (-1)^{d\eta-2}\frac{\prod_{h \neq i,j} d_h^*}{q^{d\eta-2}}\right)$$

This is again positive, contradicting the optimality of $\underline{d}^*$.

Thus, $\sum_{i=1}^{d\eta} d_i^* = d\eta$, and $d_i^* = 0$ or $d$. So exactly $\eta$ of the variables $d_i^*$ are equal to $d$. Since the optimal solution is an integer solution, it is also optimal for the integer program (5). The corresponding optimal $f = \eta \frac{d}{q} - \binom{\eta}{2}\frac{d^2}{q^2} + \ldots + (-1)^{\eta-1}\frac{d^\eta}{q^\eta} = 1 - \left(1 - \frac{d}{q}\right)^\eta$. ∎

*Proof of Theorem 1:* To check if a network code $(A, F, B)$ transmits all source processes to receiver $\beta$, it suffices to check that the determinant of the corresponding Edmonds matrix is nonzero (Theorem 2). This determinant, which we denote by $P_\beta$, is a polynomial in delay variable $D$, whose coefficients are linear in each variable $\{a_{x,j}, f_{i,j}\}$ and have degree at most $\nu$ in these variables (Lemma 1). Each column corresponds to a link in the network; the number of columns containing variable terms equals $\eta$, the number of links carrying random combinations of source processes and/or incoming signals. The product $\prod_\beta P_\beta$ for $d$ receivers is, accordingly, a polynomial in delay variable $D$, whose coefficients are polynomials in $\{a_{x,j}, f_{i,j}\}$ of degree at most $d\eta$, and in which the largest exponent of each of these variables is at most $d$. These properties still hold if some variables are set to deterministic values which do not make the product identically zero.

Linearly correlated sources can be viewed as pre-specified linear combinations of underlying independent processes. Unlike the independent sources case where each nonzero entry of the $A$ matrix can be set independently, in this case there are linear dependencies among the entries. The columns $\underline{a}_j$ of the $A$ matrix are linear functions $\underline{a}_j = \sum_k \alpha_j^k \underline{v}_j^k$ of column vectors $\underline{v}_j^k$ that represent the composition of the source processes at tail($j$) in terms of the underlying independent processes. Variables $\alpha_j^k$ in column $\underline{a}_j$ can be set independently of variables $\alpha_{j'}^k$ in other columns $\underline{a}_{j'}$. It can be seen from Lemma 1 that for any particular $j$, each product term in the polynomial $P_\beta$ for any receiver $\beta$ contains at most one variable $a_{i,j} = \sum_k \alpha_j^k v_{i,j}^k$. $P_\beta$ is thus linear in the variables $\alpha_j^k$, and also in variables $f_{i,j}$, which are unaffected by the source correlations. So any variable in the product of $d$ such polynomials has maximum exponent $d$.

Applying Lemma 2 gives us the required bound.

For the single-receiver case, the bound is attained for a network consisting only of links forming a single set of $r$ disjoint source-receiver paths. ∎

4.2 Connections with Link Reliability

*Proof of Theorem 3:* Consider any link $j$, and a set $S$ of $d'$ arbitrary $(r \times r - 1)$ rank-$(r-1)$ matrices in $(\mathbb{F}_q(D))^{r \times r-1}$, such that, for each matrix in $S$, link $j$ has among its inputs a signal whose associated vector is not in the column space of the matrix. Let $\underline{v}_i \in (\mathbb{F}_q(D))^r$ be the vector associated with the $i^{th}$ input to link $j$. Let $Y(j) = \sum_i D f_i \underline{v}_i$ be the vector associated with link $j$.

Each entry of $Y(j)$ is a polynomial in $\mathbb{F}_q(D, f_1, f_2, \ldots)$ that is linear in coefficients $f_i$. The determinant of an $r \times r$ matrix which has $Y(j)$ as one of its columns, and whose $r - 1$ other columns are independent of coefficients $f_i$, is thus linear in coefficients $f_i$. The product of $d'$ such determinants has maximum degree $d'$ in coefficients $f_i$.

If coefficients $f_i$ are chosen uniformly and independently from $\mathbb{F}_q$, by the Schwartz-Zippel Theorem, this product is nonzero with probability at least $1 - d'/q$. Denoting by $E_{S,j}$ the event that adding $Y(j)$ as an additional column to each of the matrices in $S$ gives a full rank matrix, we have $\Pr(E_{S,j}) \geq 1 - d'/q$.

Next consider a number of sets $S_1, S_2, \ldots, S_n$ each consisting of $d'$ arbitrary $(r \times r - 1)$ rank-$(r-1)$ matrices, such that for each matrix in $S_k$, $1 \geq k \geq n$, link $j$ has among its inputs a signal whose associated vector is not in the column space of the matrix. Then $\Pr(\bigcup_{k=1}^{n} E_{S_k,j}) \geq 1 - d'/q$.

Each receiver receives all processes successfully if the submatrix of $AG$ corresponding to $r$ of its incident incoming links, or terminal links, has full rank. The connection problem is feasible if and only if each receiver has a set of $r$ link-disjoint paths, one from each source.

Let $j$ be the highest-indexed link in an ancestral ordering, where lower-indexed links feed into higher-indexed links. Consider any given signals on all other links. There are three cases:

Case 1: Regardless of the code coefficients for $j$, there cannot exist full rank sets of $r$ terminal links for each receiver.

Case 2: Regardless of the code coefficients for $j$, each receiver has a full rank set of $r$ terminal links.

Case 3: For some choice of code coefficients for link $j$, each receiver has a full rank set of $r$ terminal links, i.e. link $j$ has among its inputs signals whose associated vectors are not in the column space of the submatrices of $AG$ corresponding to the terminal links of one or more other receivers. By our earlier arguments, such a choice is made with probability at least $1 - d'/q$, where $d'$ is the number of receivers downstream of link $j$.

In all three cases, the probability that each receiver has a set of $r$ terminal links with a full rank set of inputs when code coefficients for link $j$ are chosen randomly is greater than or equal to that in the case where link $j$ is deleted with probability $d/q \geq d'/q$.

We next consider the problem where link $j$ is deleted with probability $d/q$, and random code coefficients are chosen for all other links. From our earlier arguments, the probability that any set of $r$ undeleted paths to each receiver has a full rank set of inputs is less than or equal to the probability of success in the original network coding problem.

We continue in this fashion, at each stage considering a new problem in which we delete with probability $d/q$ the next highest-indexed link as well as each previously considered link. Random code coefficients are chosen for all other links. At each stage, for any choice of surviving links among the set of randomly deleted links, the problem is either infeasible, or there exist one or more sets of random coding links incident to undeleted paths to each receiver which, if full rank, preserve feasibility of the problem. The probability that any set of $r$ undeleted paths to each receiver has a full rank set of inputs is less than or equal to the probability of success in the original network coding problem. ∎

*Proof of Theorem 4:* For a given network of non-failed links, we can find a lower bound by considering the more general case where a source process can be available at one or more source node locations, and by analyzing the probability that the connections remain feasible when links fail with probability $1/q$, which by Theorem 3 gives us a lower bound on network coding success probability. The success probability for a network whose links fail with probability $p$ is thus lower bounded by the probability that the connections remain feasible when links fail with probability $1 - (1-p)(1-1/q)$.

We show by induction on $y$ that a network consisting of $r + y$ disjoint source-receiver paths, any $r$ of which can transmit all processes, has a success probability that is less than or equal to that for any $y$-redundant network.

Consider a network $\mathcal{G}_1$ consisting of $r + y$ disjoint source-receiver paths any $r$ of which can transmit all processes. Let $\mathcal{G}_2$ be any other $y$-redundant network.

For $i = 1, 2$, we consider a set $\mathcal{P}_i$ of links forming $r$ disjoint paths from each source to the receiver on graph $\mathcal{G}_i$. We distinguish two cases:

Case 1: None of the links in $\mathcal{P}_i$ fail. In this case the connections are feasible.

Case 2: There exists some link $j_i \in \mathcal{P}_i$ that fails.

The probability of either case occurring is the same for $i = 1, 2$. Since $$\Pr(\text{success}) = \Pr(\text{case 1}) + \Pr(\text{case 2}) \Pr(\text{success}|\text{case 2})$$

$\Pr(\text{success}|i = 1) \leq \Pr(\text{success}|i = 2)$ iff $\Pr(\text{success}|\text{case 2}, i = 1) \leq \Pr(\text{success}|\text{case 2}, i = 2)$.

For $y = 0$, the hypothesis is true since $\Pr(\text{success}|\text{case 2}) = 0$ for $i = 1, 2$. For $y > 0$, in case 2 we can remove link $j_i$ leaving a $(y-1)$-redundant graph $\mathcal{G}'_i$. By the induction hypothesis, the probability of success for $\mathcal{G}'_1$ is less than or equal to that for $\mathcal{G}'_2$.

Thus, $\mathcal{G}_1$ gives a lower bound on success probability, which is the probability that all links on at least $r$ of $r + y$ length-$L$ paths do not fail. The result follows from observing that each path does not fail with probability $\left((1-p)(1-\frac{1}{q})\right)^L$. ∎

5 Conclusion

We have presented bounds for the success probability of distributed randomized network coding for multi-source multicast in networks. The first is a very general bound for arbitrary networks, which may have cycles or delay, in terms of the number of receivers and the number of links with independently chosen linear mappings. We have also shown an approach for obtaining tighter results for more specific networks. For any given acyclic network, we can bound randomized coding success probability by the probability of connection feasibility in a related network problem with unreliable links. From this we obtain a success probability bound for randomized network coding in networks with unreliable links and excess capacity, in terms of link failure probability and amount of redundancy.

Further work includes extensions to different applications, such as non-multicast. It would also be of interest to consider various protocols for different communication scenarios and evaluate the associated overhead, comparing this with traditional routing based approaches.

Acknowledgments

This work was done in collaboration with Ralf Koetter. We would also like to thank Ben Leong and Yu-Han Chang for helpful discussions.

References

[1] R. Ahlswede, N. Cai, S.-Y.R. Li and R.W. Yeung, "Network Information Flow", IEEE-IT, vol. 46, pp. 1204-1216, 2000.

[2] T. Ho, D. R. Karger, M. Médard and R. Koetter, "Network Coding from a Network Flow Perspective ", Proceedings of the 2003 IEEE International Symposium on Information Theory.

[3] T. Ho, R. Koetter, M. Médard, D. R. Karger and M. Effros, "The Benefits of Coding over Routing in a Randomized Setting", Proceedings of the 2003 IEEE International Symposium on Information Theory.

[4] S. Jaggi, P.A. Chou and K. Jain, "Low Complexity Algebraic Network Codes", Proceedings of the 2003 IEEE International Symposium on Information Theory.

[5] R. Koetter and M. Médard, "An Algebraic Approach to Network Coding", IEEE/ACM Transactions on Networking, to appear.

[6] S.-Y. R. Li, R. W. Yeung, and N. Cai, "Linear network coding", IEEE Transactions on Information Theory, vol. 49, pp. 371-381, 2003.

[7] P. Sanders, S. Egner, and L. Tolhuizen, "Polynomial Time Algorithms For Network Information Flow", In 15th ACM Symposium on Parallel Algorithms and Architectures, pages 286-294, 2003.

ANNEX A4

On the utility of network coding in dynamic environments

*Abstract*— Many wireless applications, such as ad-hoc networks and sensor networks, require decentralized operation in dynamically varying environments. We consider a distributed randomized network coding approach that enables efficient decentralized operation of multi-source multicast networks. We show that this approach provides substantial benefits over traditional routing methods in dynamically varying environments.

We present a set of empirical trials measuring the performance of network coding versus an approximate online Steiner tree routing approach when connections vary dynamically. The results show that network coding achieves superior performance in a significant fraction of our randomly generated network examples. Such dynamic settings represent a substantially broader class of networking problems than previously recognized for which network coding shows promise of significant practical benefits compared to routing.

*Index Terms*— Multicast, ad-hoc networks, network coding, Steiner tree

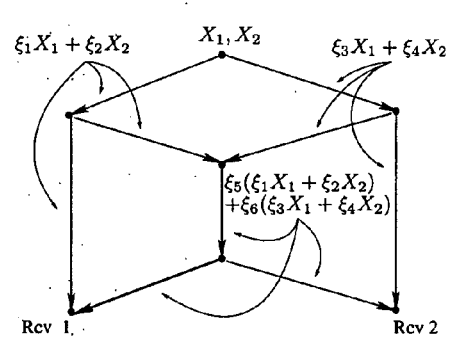

Fig. 1. An example of distributed randomized network coding. $X_1$ and $X_2$ are the source processes being multicast to the receivers, and the coefficients $\xi_i$ are randomly chosen elements of a finite field. The label on each link represents the signal being carried on the link.

I. INTRODUCTION

In this paper, we consider the utility of network coding compared to routing for multi-input multicast in distributed, dynamically changing environments. This set-up encompasses a rich family of problems, such as the delivery of multicast content and the reachback problem for sensor networks, in which several sources transmit to a single receiver.

Network coding, as a superset of routing, has been shown to offer significant capacity gains for specially constructed networks [1], [15]. Apart from such examples, however, the benefits of centralized network coding over centralized optimal routing have not been as clear.

On the other hand, distributed or dynamic settings, such as in mobile ad-hoc or sensor networks, make optimal centralized control more costly or inconvenient. Such environments pose more challenges for routing-only approaches. For instance, in networks with large numbers of nodes and/or changing topologies, it may be expensive or infeasible to reliably maintain routing state at network nodes. For networks with dynamically varying multicast connections, it may be desirable to avoid recomputing distribution trees for existing connections to accommodate new connections.

Reference [6] proposed a distributed randomized network coding approach, and showed analytically that, for a completely decentralized single transmitter multicast system over a regular grid, distributed randomized coding outperformed distributed randomized flooding without coding. This paper significantly widens the scope of scenarios in which network coding presents benefits by extending consideration to randomly generated geometric graphs, to multiple transmitters and, most importantly, by comparing to quasi-optimal online routing, where, for each transmitter sequentially, a multicast tree is selected in a centralized fashion.

In this randomized network coding approach, all nodes other than the receiver nodes independently choose random linear mappings from inputs onto outputs over some field. An illustration is given in Figure 1. Note that such an approach is intrinsically very different from traditional routing approaches. Data originating at different sources can be mixed through linear algebraic operations. Moreover, no coordination among nodes in their selection of input to output mappings is required. The receivers need only know the overall linear combination of source processes in each of their incoming signals. This information can be sent with each signal or packet as a vector of coefficients corresponding to each of the source processes, and updated at each coding node by applying the same linear mappings to the coefficient vectors as to the information signals. The required overhead of transmitting these coefficients decreases with increasing length of blocks over which the codes and network state are expected to remain constant.

This distributed coding approach achieves optimal network capacity asymptotically in the length of the code [6]. The distributed nature of this approach also ties in well with considerations of robustness to changing network conditions. Moreover, issues of stability, such as those arising from propagation of routing information, are obviated by the fact that each node selects its code independently from the others.

While theoretical performance bounds have been derived for this randomized coding approach [6], [7], exact theoretical analysis of optimal online multicast routing is difficult. Multicast routing is closely related to the NP-complete Steiner-tree problem, for which various heuristic and approximate algorithms have been considered. We compare, with simulations on randomly generated graphs, the relative performance of distributed randomized coding and a Steiner heuristic algorithm presented by Kodialam [10], in which, for each transmitter, a tree is selected in a centralized fashion. Kodialam states that this heuristic's performance is comparable to or better than many alternative algorithms for centralized tree selection. These trees represent multicast routes in our setting. The networks we consider in this paper are random geometric graphs with degree constraints. We seek to model the kinds of topologies encountered in wireless ad-hoc networks with a limited number of channels, and nodes which may turn on and off intermittently. We do not assume omnidirectional transmissions in this paper, though the randomized coding approach could be adapted for this scenario.

This paper does not consider aspects such as resource and energy allocation, but focuses on optimally exploiting a given set of resources. There are also many issues surrounding the adaptation of protocols, which generally assume routing, to random coding approaches. We do not address these here, but rather seek to establish that the potential benefits of randomized network coding justify future consideration of protocol compatibility with or adaptation to network codes.

II. BACKGROUND AND RELATED WORK

Network coding was introduced by Ahlswede et al. [1], who showed that as the network coding symbol size approaches infinity, a source can multicast information at a rate approaching the smallest minimum cut between the source and any receiver, which is not always possible with routing alone. Li et al. [12] showed that linear coding with finite symbol size is sufficient for multicast. Koetter and Médard [11] presented an algebraic framework for linear network coding that extended previous results to arbitrary networks and robust networking, and proved the achievability with time-invariant solutions of the min-cut max-flow bound for networks with delay and cycles. Using this algebraic framework, Ho et al. presented and analyzed distributed randomized network coding in [6], and gave further theoretical analysis in [7]. Concurrent independent work by Sanders et al. [15] and Jaggi et al. [8] considered single-source multicast on acyclic delay-free graphs, giving centralized deterministic and randomized polynomial-time algorithms for finding network coding solutions over a subgraph consisting of flow solutions to each receiver. Various protocols for and experimental demonstrations of randomized network coding [5] and non-randomized network coding [17], [13] have also been presented. Reference [5] considers single source multicast on Internet service provider network topologies.

*Input:* A directed graph $G = (N, E)$ with edge costs, a source node $s$ and a set $R$ of receiver ndoes.
*Output:* A low cost directed Steiner tree rooted at $s$ and spanning all the nodes in $R$.
*Method:*
1. $X \leftarrow R$;
2. while $X \neq \Phi$ do
3.    Run Djikstra's shortest path algorithm with source $s$ until a node $r \in X$ is reached;
4.    Add the path from $s$ to $r$ to the Steiner tree built so far;
5.    Set the costs of all the edges along this path to zero;
6.    $X \leftarrow X - r$;
7. endwhile Fig. 2. Pseudo-code for the Nearest Node First (NNF) Algorithm.

Approximation algorithms for undirected Steiner tree problem are given in [3], [9]. Waxman [16] considers undirected Steiner tree heuristics in the context of multicast routing. The Steiner tree problem for directed graphs is considered in [4], [14]. The online case is further discussed by Awerbuch et al. [2] for undirected graphs, and by Kodialam et al. [10] for directed graphs.

III. PROBLEM STATEMENT AND ALGORITHMS

We consider an online multi-source multicast problem in which source turn on and off dynamically. Thus, multicast connection requests are presented and accommodated sequentially. Existing connections are not disrupted or rerouted in trying to accommodate new requests. The algorithms are evaluated on the basis of the number of connections that are rejected or blocked owing to capacity limitations, and the multicast throughput supported.

For simplicity, we run our trials on directed acyclic networks, assuming that there exist mechanisms, e.g. based on geographical position or connection information, to avoid transmitting information in cycles. We also assume integer edge capacities and integer source entropy rates.

The online routing algorithm we consider finds a multicast tree for each new source using the Nearest Node First (NNF) heuristic for Steiner tree computation from [10], which uses Dijkstra's shortest path algorithm to reach receiver nodes in order of increasing distance from the source. Dijkstra's shortest path algorithm is run until a receiver node is reached. The corresponding source-receiver path is added to the Steiner tree and the costs of all the edges along this path are set to zero. The algorithm is then applied recursively on the remaining receiver nodes. This algorithm is described formally in Figure 2.

The coding algorithm we use is from [6]; we give a brief description here. The algorithm assumes that information is transmitted as vectors of bits. Linear coding[1] is carried out on vectors of length $u$ in the finite field $\mathbb{F}_{2^u}$. The signal $Y(j)$ on a link $j$ is a linear combination of processes $X_i$ generated at node $v = \text{tail}(j)$ and signals $Y(l)$ on incident incoming links $l$. This is represented by the equation $$Y(j) = \sum_{\{i\,:\,X_i \text{ generated at } v\}} a_{i,j} X_i + \sum_{\{l\,:\,\text{head}(l)\,=\,v\}} f_{l,j} Y(l)$$

[1] which is sufficient for multicast [12]

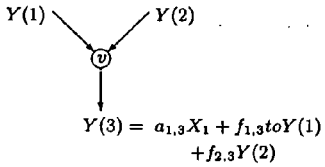

Fig. 3. Illustration of linear coding at a node.

An output process $Z(\beta, i)$ at receiver node $\beta$ is a linear combination of signals on its terminal links, represented as $$Z(\beta, i) = \sum_{\{l \,:\, \text{head}(l) = \beta\}} b_{\beta_i, l} Y(l) \;,$$

An illustration of linear coding at a network node is given in Figure 3.

A randomly chosen network code is successful if each receiver obtains as many linearly independent combinations as the number of source processes. This enables it to decode each source process.

In order for random network coding to be attractive, the particular size of the field (code length) we use is important. Ho et al. [6] provides a lower bound for the success probability of randomized coding, $\left(1 - \frac{d}{q}\right)^\nu$, where $q$ is the finite field size, $d$ is the number of receivers, and $\nu$ is the number of links involved in the randomized coding. While this bound provides a worst-case guarantee over all possible network topologies with particular values of $d$, $q$, and $\nu$, they may be pessimistic for most topologies. Thus, we wish to investigate what code lengths are necessary in practice to match or surpass the performance of traditional routing approaches.

The basic randomized network coding approach requires no coordination among nodes in the selection of code coefficients. If we allow for retrials to find successful codes, we in effect trade code length for some rudimentary coordination. Implementations for various applications may not be completely protocol-free, but the roles and requirements for protocols may be substantially redefined in this new environment.

IV. EXPERIMENTAL SETUP

We run our trials on randomly generated geometric graphs, which model wireless ad-hoc network topologies. Test networks are generated with the following parameters: number of nodes $n$, number of sources $r$, number of receivers $d$, transmission range $\rho$, maximum in-degree and out-degree $i$. The parameter values for the tests are chosen such that the resulting random graphs would in general be connected and able to support some of the desired connections, while being small enough for the simulations to run efficiently. For each trial, $n$ nodes are scattered uniformly over a unit square. To create an acyclic graph we order the nodes by their $x$-coordinate and choose the direction of each link to be from the lower numbered to the higher numbered node. Any pair of nodes within a distance $\rho$ of each other is connected by a unit capacity link, and any pair within distance $\rho/\sqrt{2}$ of each other is connected by a link of capacity 2, provided this does not violate the degree constraints. The receiver nodes are chosen to be the $d$

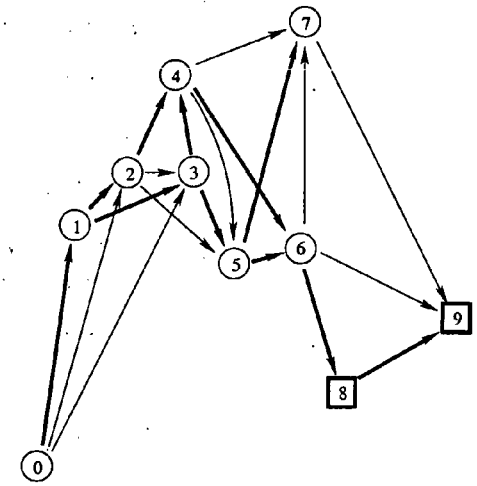

Fig. 4. An example of a randomly generated network used in our trials. This network was generated with parameters $n = 10$, $s = 6$, $r = 2$, $i = 4$, $\rho = 0.6$. Nodes are labeled as circles, and the receivers are squares; thick lines denote links with capacity two, and thin lines denote links with capacity one.

highest numbered nodes, and $r$ source nodes are chosen randomly (with replacement) from among the lower-numbered half of the nodes. An example topology is given in Figure 4.

Each trial consists of a number of periods during which each source is either on (i.e. is actively transmitting) or off (i.e. not transmitting). During each period, any currently-on source turns off with probability $p_0$, and any currently-off source turns on with probability $p_0$ if it is able to reach all the receivers. A source that is unable to reach all the receivers is blocked from turning on.

Initially all sources are off. For routing, in order for a source to turn on, it would need to find a tree connecting it to all the receivers using spare network capacity unreserved by other sources, and would then reserve capacity corresponding to the tree. A source that turns off frees up its reserved links for new connections. For coding, each network node that tries to turn on initiates up to three random choices of code coefficients within the network. If the receivers are able to decode the new source in addition to all the sources that are already on, the new source is allowed to turn on. A source that is not allowed to turn on is considered a blocked request.

The frequency of blocked requests and the average throughput are calculated for windows of 250 periods until these measurements reach steady-state, i.e. measurements in three consecutive periods being within a factor of 0.1 from each other. This avoids transient initial startup behavior.

V. RESULTS AND DISCUSSION

We ran simulations on 242 networks generated randomly using 45 different parameter combinations. In 44 of these networks, coding outperformed routing in both blocking rate and throughput, doing better by more than 10% in at least one of

TABLE I

A SAMPLE OF RESULTS ON GRAPHS GENERATED WITH THE FOLLOWING PARAMETERS: NUMBER OF NODES $n$, NUMBER OF SOURCES $r$, NUMBER OF RECEIVERS $d$, TRANSMISSION RANGE $p$, MAXIMUM IN-DEGREE AND OUT-DEGREE $i$. $b_r$ AND $b_c$ ARE THE RATE OF BLOCKED CONNECTIONS FOR ROUTING AND CODING, RESPECTIVELY, AND $t_r$ AND $t_c$ ARE THE CORRESPONDING THROUGHPUTS:

| Parameters | | | | | | Results | | | | |
|---|---|---|---|---|---|---|---|---|---|---|
| nodes $n$ | srcs $s$ | rcvrs $d$ | deg $i$ | range $p$ | prob $p_0$ | Network | $b_r$ | $t_r$ | $b_c$ | $t_c$ |
| 8 | 6 | 1 | 4 | 0.5 | 0.6 | 1 | 1.54 | 1.46 | 1.55 | 1.46 |
|   |   |   |   |   |   | 2 | 0.72 | 2.27 | 0.74 | 2.31 |
|   |   |   |   |   |   | 3 | 0.26 | 2.78 | 0.23 | 2.74 |
| 9 | 6 | 2 | 3 | 0.5 | 0.7 | 1 | 2.14 | 0.84 | 2.17 | 0.83 |
|   |   |   |   |   |   | 2 | 0.70 | 2.31 | 0.68 | 2.28 |
|   |   |   |   |   |   | 3 | 0.90 | 2.05 | 0.71 | 2.26 |
| 10 | 4 | 2 | 4 | 0.5 | 0.6 | 1 | 0.61 | 1.43 | 0.50 | 1.45 |
|    |   |   |   |   |   | 2 | 1.62 | 0.53 | 1.52 | 0.54 |
|    |   |   |   |   |   | 3 | 0.14 | 1.96 | 0.00 | 2.05 |
| 10 | 6 | 2 | 4 | 0.5 | 0.5 | 1 | 1.31 | 1.63 | 0.71 | 2.28 |
|    |   |   |   |   |   | 2 | 0.74 | 2.17 | 0.64 | 2.42 |
|    |   |   |   |   |   | 3 | 1.51 | 1.54 | 1.49 | 1.61 |
| 10 | 9 | 3 | 3 | 0.5 | 0.7 | 1 | 1.05 | 2.37 | 1.14 | 2.42 |
|    |   |   |   |   |   | 2 | 1.36 | 2.22 | 1.06 | 2.39 |
|    |   |   |   |   |   | 3 | 2.67 | 0.87 | 2.56 | 0.89 |
| 12 | 6 | 2 | 4 | 0.5 | 0.6 | 1 | 1.44 | 1.67 | 0.71 | 2.31 |
|    |   |   |   |   |   | 2 | 0.28 | 2.72 | 0.29 | 2.75 |
|    |   |   |   |   |   | 3 | 0.75 | 2.28 | 0.73 | 2.31 |
| 12 | 8 | 2 | 3 | 0.5 | 0.7 | 1 | 2.39 | 1.73 | 2.34 | 1.74 |
|    |   |   |   |   |   | 2 | 2.29 | 1.73 | 2.23 | 1.74 |
|    |   |   |   |   |   | 3 | 1.57 | 2.48 | 1.52 | 2.51 | these parameters. In 15 of these, coding outperformed routing in both parameters by more than 10%. In the rest, routing and coding showed comparable performance. Some results for various randomly generated networks are given in table I.

These simulations do not attempt to quantify precisely the differences in performance and overhead of randomized coding and online routing. However, they serve as useful illustrations in two ways.

Firstly, they show that the performance of the Steiner tree heuristic is exceeded by randomized coding over a non-negligible proportion of our randomly constructed graphs, indicating that when connections vary dynamically, coding offers advantages that are not circumscribed to carefully constructed examples. This is in contrast to static settings with optimal centralized control.

Secondly, the simulations illustrate the kinds of field sizes needed in practice for networks with a moderate number of nodes. Field size is important, since it affects memory and complexity requirements. To this end, the simulations use a small field size that still allows randomized coding to generally match the performance of the Steiner heuristic, and to surpass it in networks whose topology makes coding desirable over trees. The theoretical bounds of [6], [7] guarantee the optimality of randomized coding for large enough field sizes, but they are tight for worst-case network scenarios. In our trials, a field size of 17 with up to three retrials proved sufficient to achieve equal or better performance compared to the Steiner heuristic. The simulations show the applicability of short network code lengths for moderately-sized networks.

VI. CONCLUSIONS AND FURTHER WORK

We have compared a distributed randomized network coding approach to an approximate online Steiner routing algorithm on multi-source multicast networks with dynamically varying connections. Our results show that for a significant proportion of randomly generated networks, the coding approach achieves superior performance over the routing-based approach. Such dynamic settings represent a substantially wider class of networking problems than previously recognized for which network coding shows promise of substantial benefits compared to routing. Our results suggest that the decentralized nature and robustness of randomized network coding can offer significant advantages in settings that hinder optimal centralized network control.

Further work includes investigation of other dynamically varying network scenarios, and extensions to non-uniform code distributions, possibly chosen adaptively or with some rudimentary coordination, to optimize different performance goals. Another question concerns selective placement of randomized coding nodes. The randomized and distributed nature of the approach also leads us naturally to consider applications in network security. It would also be interesting to consider protocol issues for different communication scenarios, and to compare specific coding and routing protocols over a range of performance metrics.

REFERENCES

[1] R. Ahlswede, N. Cai, S.-Y. Li, and R. Yeung. Network information flow. *IEEE Transactions on Information Theory*, 46:1204–1216, 2000.

[2] B. Awerbuch, Y. Azar, and Y. Bartal. On-line generalized steiner problem. In *Proceedings of the 7th Annual ACM-SIAM Symposium on Discrete Algorithms*, 1996.

[3] P. Berman and V. Ramaiyer. Improved approximation algorithms for the steiner tree problem. *Journal of Algorithms*, 17:381–408, 1994.

[4] M. Charikar, C. Chekuri, T. Cheung, Z. Dai, A. Goel, S. Guha, and M. Li. Approximation algorithms for directed steiner problems. In *Proceedings of the 9th ACM-SIAM Symposium on Discrete Algorithms*, 1998.

[5] P. A. Chou, Y. Wu, and K. Jain. Practical network coding. In *Proceedings of 41st Annual Allerton Conference on Communication, Control, and Computing*, October 2003.

[6] T. Ho, R. Koetter, M. Médard, D. R. Karger, and M. Effros. The benefits of coding over routing in a randomized setting. In *Proceedings of 2003 IEEE International Symposium on Information Theory*, June 2003.

[7] T. Ho, M. Médard, J. Shi, M. Effros, and D. R. Karger. On randomized network coding. In *Proceedings of 41st Annual Allerton Conference on Communication, Control, and Computing*, October 2003.

[8] S. Jaggi, P. Chou, and K. Jain. Low complexity algebraic network codes. In *Proceedings of the IEEE International Symposium on Information Theory*, 2003.

[9] M. Karpinsky and A. Zelikovsky. New approximation algorithms for the steiner tree problem. In *Technical Report, Electronic Colloquium on Computational Complexity (ECCC) TR95-030*, 1995.

[10] M. S. Kodialam, T. V. Lakshman, and S. Sengupta. Online multicast routing with bandwidth guarantees: a new approach using multicast network flow. In *Measurement and Modeling of Computer Systems*, pages 296–306, 2000.

[11] R. Koetter and M. Médard. An algebraic approach to network coding. *IEEE/ACM Transactions on Networking*, to appear.

[12] S.-Y. R. Li, R. W. Yeung, and N. Cai. Linear network coding. *IEEE Transactions on Information Theory*, 49:371–381, 2003.

[13] T. Noguchi, T. Matsuda, and M. Yamamoto. Performance evaluation of new multicast architecture with network coding. *IEICE Transactions on Communication*, E86-B, No.6, June 2003.

[14] S. Ramanathan. Multicast tree generation in networks with asymmetric links. *IEEE Transactions on Networking*, 4, August 1996.

[15] P. Sanders, S. Egner, and L. Tolhuizen. Polynomial time algorithms for network information flow. In *15th ACM Symposium on Parallel Algorithms and Architectures*, pages 286–294, 2003.

[16] B. M. Waxman. Performance evaluation of multipoint routing algorithms. In *Proceedings of IEEE INFOCOM*, 1993.

[17] Y. Zhu, B. Li, and J. Guo. Multicast with network coding in application-layer overlay networks. *IEEE Journal on Selected Areas in Communications*, 22(1), 2004.

What is claimed is:

1. A network comprising:
   one or more source nodes, wherein source processes are observable at the source nodes;
   one or more receiver nodes, wherein receiver processes are observable at the receiver nodes; and
   coding nodes, allowing communication of the source processes to each receiver node, the coding nodes being connected with input links for communication of input signals to the coding nodes and output links for communication of output signals from the coding nodes,
   wherein the output signals are a linear combination of the input signals and wherein coefficients of the linear combination are randomly chosen,
   wherein the overall linear combination of source processes present in each signal in the network is specified as a vector of coefficients, each coefficient corresponding to a source process, and
   wherein the vector of coefficients is transmitted through the network and updated at each coding node by applying to the vector of coefficients linear combinations, wherein the linear combinations applied to the vector of coefficients are the same as the linear combinations applied to data transmitted through the network.

2. The network of claim 1, wherein the network is an acyclic network.

3. The network of claim 1, wherein the network comprises cycles and delays.

4. The network of claim 1, wherein the coefficients of the linear combination are randomly chosen from a field of coefficients.

5. The network of claim 4, wherein the field is a finite field.

6. The network of claim 1, wherein the network is a computer network.

7. The network of claim 1, wherein the input signals comprise input bits and the output signals comprise output bits.

8. A method for transmitting processes from one or more sources to each receiver of one or more receivers in a network, the method comprising:
   providing coding nodes between the one or more sources and the one or more receivers;
   providing, for each coding node, input links for transmitting input signals to the coding node, and output links for transmitting output signals from the coding nodes, the output signals being a linear combination of the input signals;
   randomly choosing, for each coding node, coding coefficients, the coding coefficients being the coefficients of the linear combination of the input signals,
   wherein an overall linear combination of the processes transmitted from the one or more sources present in each signal in the network is specified as a vector of coefficients, each coefficient corresponding to a process to be transmitted from one or more sources, and
   wherein the vector of coefficients is transmitted through the network and updated at each coding node by applying to the vector of coefficients linear combinations, wherein the linear combinations applied to the vector of coefficients are the same as the linear combinations applied to data transmitted through the network.

9. The method of claim 8, wherein the network is an acyclic network.

10. The method of claim 8, wherein the network comprises cycles and delays.

11. The method of claim 8, wherein the network is a computer network.

* * * * *